(12) United States Patent
Karaoguz et al.

(10) Patent No.: US 9,179,400 B2
(45) Date of Patent: Nov. 3, 2015

(54) COMMUNICATIVELY COUPLING WLAN AND FEMTOCELL NETWORKS UTILIZING A FEMTOCELL-TO-WLAN NETWORK BRIDGE AND CONTROLLER

(75) Inventors: Jeyhan Karaoguz, Irvine, CA (US); Nambirajan Seshadri, Sr., Irvine, CA (US); Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/595,638

(22) Filed: Aug. 27, 2012

(65) Prior Publication Data

US 2012/0322450 A1 Dec. 20, 2012

Related U.S. Application Data

(63) Continuation of application No. 12/470,997, filed on May 22, 2009, now abandoned.

(51) Int. Cl.
*H04W 48/18* (2009.01)
*H04L 12/46* (2006.01)
*H04L 12/54* (2013.01)
*H04W 84/04* (2009.01)

(52) U.S. Cl.
CPC .......... *H04W 48/18* (2013.01); *H04L 12/4625* (2013.01); *H04L 12/5692* (2013.01); *H04L 12/5695* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 8,929,331 | B2 * | 1/2015 | Karaoguz et al. | 370/331 |
| 9,025,534 | B2 * | 5/2015 | Karaoguz et al. | 370/329 |
| 2008/0076392 | A1 * | 3/2008 | Khetawat et al. | 455/411 |
| 2008/0207170 | A1 * | 8/2008 | Khetawat et al. | 455/411 |
| 2008/0305825 | A1 * | 12/2008 | Shaheen | 455/552.1 |
| 2009/0046665 | A1 | 2/2009 | Robson et al. | |
| 2009/0052350 | A1 * | 2/2009 | Chen et al. | 370/255 |
| 2009/0135795 | A1 * | 5/2009 | Lim et al. | 370/338 |
| 2009/0156213 | A1 | 6/2009 | Spinelli et al. | |
| 2009/0168726 | A1 * | 7/2009 | Thalanany et al. | 370/332 |
| 2009/0274104 | A1 | 11/2009 | Addy | |
| 2009/0286510 | A1 | 11/2009 | Huber et al. | |
| 2010/0016022 | A1 | 1/2010 | Liu et al. | |
| 2010/0278141 | A1 * | 11/2010 | Choi-Grogan et al. | 370/331 |
| 2010/0296487 | A1 * | 11/2010 | Karaoguz et al. | 370/332 |
| 2010/0296497 | A1 * | 11/2010 | Karaoguz et al. | 370/338 |
| 2010/0296498 | A1 * | 11/2010 | Karaoguz et al. | 370/338 |
| 2010/0296499 | A1 | 11/2010 | Karaoguz et al. | |
| 2012/0122424 | A1 * | 5/2012 | Herscovici et al. | 455/411 |

* cited by examiner

*Primary Examiner* — Donald Mills
(74) *Attorney, Agent, or Firm* — Sterne, Kessler, Goldstein & Fox P.L.L.C.

(57) ABSTRACT

Aspects of a method and system for communicatively coupling WLAN and femtocell networks utilizing a FC-to-WLAN network bridge and controller are provided. In this regard, data communicated via one or more femtocells and one or more WLAN access points may be managed via a FC-to-WLAN network bridge and controller communicatively coupled between a femtocell controller and an access point controller. The femtocell controller may be operable to manage and/or control operation of the one or more femtocells, and the access point controller may be operable to manage and/or control operation of the one or more WLAN access points. The FC-to-WLAN network bridge and controller, the femtocell controller, and the access point controller may intemperate to manage data communicated between a first end-user device communicatively coupled to one of the femtocells and a second end-user device communicatively coupled to one of the access points.

20 Claims, 9 Drawing Sheets

COMMUNICATIVELY COUPLING WLAN AND FEMTOCELL NETWORKS UTILIZING A FEMTOCELL-TO-WLAN NETWORK BRIDGE AND CONTROLLER

CROSS-REFERENCE TO RELATED APPLICATIONS/INCORPORATION BY REFERENCE

This application is a continuation of U.S. application Ser. No. 12/470,997, filed on May 22, 2009.

This patent application makes reference to:
U.S. patent application Ser. No. 12/470,764, filed on May 22, 2009;
U.S. patent application Ser. No. 12/470,772, filed on May 22, 2009;
U.S. patent application Ser. No. 12/470,826, filed on May 22, 2009;
U.S. patent application Ser. No. 12/470,983, filed on May 22, 2009.

Each of the above stated applications is hereby incorporated herein by reference in its entirety.

FIELD OF THE INVENTION

Certain embodiments of the invention relate to networking. More specifically, certain embodiments of the invention relate to a method and system for communicatively coupling WLAN and femtocell networks utilizing FC-to-WLAN network bridge and controller.

BACKGROUND OF THE INVENTION

An access point is a device that may be placed in a customer's residence or in a business environment, for example, and may provide WLAN or Wi-Fi service. An access point may be enabled to connect an endpoint device such as a computer or handheld wireless device to an intranet or an internet service provider (ISP) via a physical broadband connection which may be, for example, a digital subscriber line (DSL) connection and/or a cable connection. Access points may communicate in adherence to one or more 802.11 standards.

Similar to access points, femtocells may be placed in a customer's residence or in a small business environment as well. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

In some ways, the functionality and/or services provided by an access point may overlap with functionality and/or services provided by a femtocell. On the other hand access points and femtocells each have their advantages and disadvantages. Accordingly, coordination of coexistent access points and femtocells a LAN or enterprise network may present a number of challenges to network administrators.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicatively coupling WLAN and femtocell networks utilizing a FC-to-WLAN bridge and controller, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
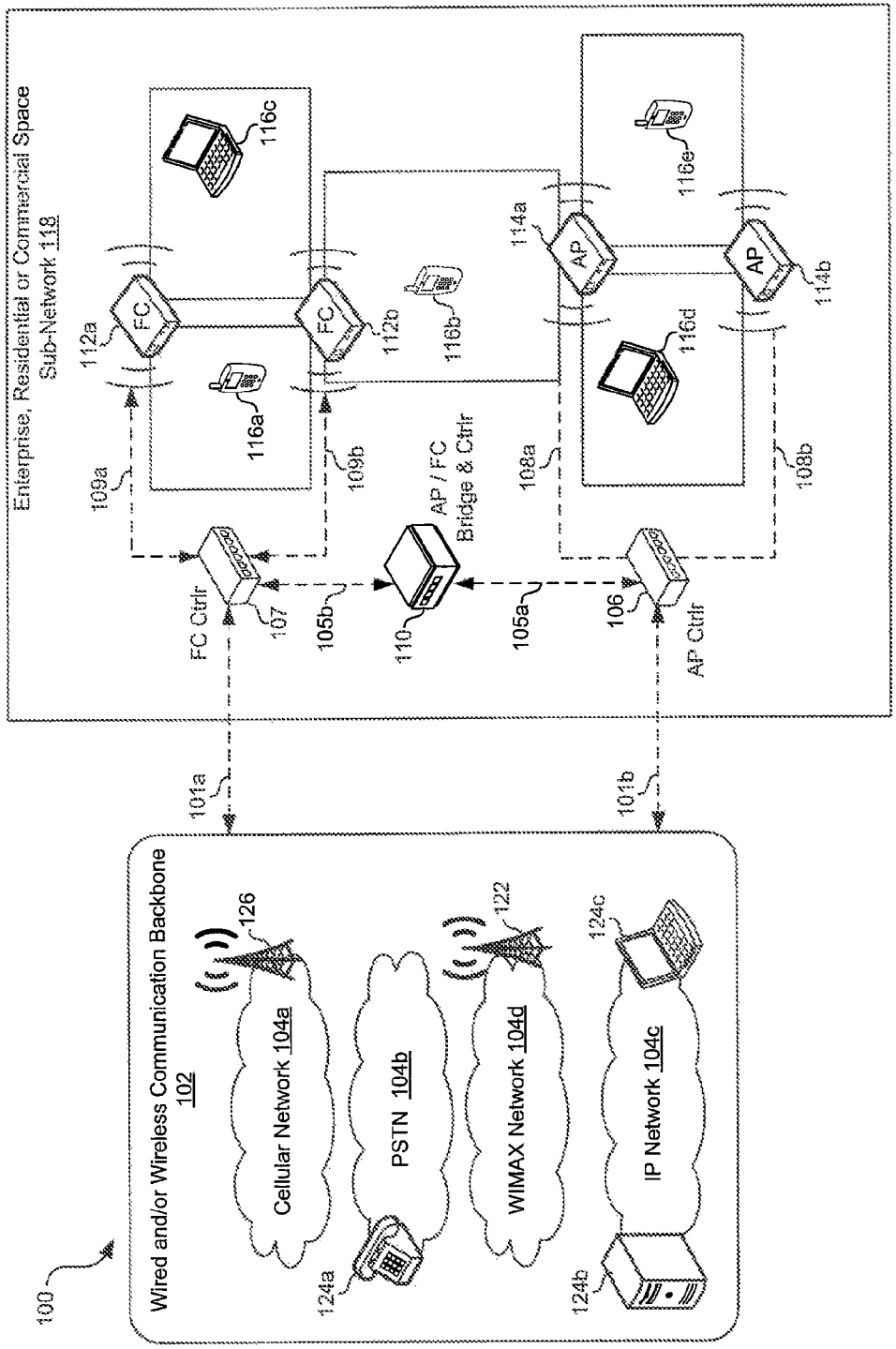
FIG. 1A is a diagram illustrating an exemplary FC-to-WLAN network comprising femtocells and access points, in accordance with an embodiment of the invention.

Certain embodiments of the invention may be found in a method and system for communicatively coupling WLAN and femtocell networks utilizing a multi-standard, femtocell (FC) to wireless local area networking (WLAN), network bridge and controller. In various exemplary embodiments of the invention, data communicated via one or more femtocells and one or more WLAN access points may be managed via a FC-to-WLAN network bridge and controller communicatively coupled to and/or between a femtocell controller and an access point controller. The femtocell controller may be operable to manage and/or control operation of the one or more femtocells, and the access point controller may be operable to manage and/or control operation of the one or more WLAN access points. The FC-to-WLAN network bridge and controller, the femtocell controller, and the access point controller may interoperate to manage data communicated between a first end-user device communicatively coupled to one of the femtocells and a second end-user device communicatively coupled to one of the access points. Data communicated between the first end-user device and the second end-user device may traverse the femtocell controller, the FC-to-WLAN network bridge and controller, and the access point controller. The FC-to-WLAN network bridge and controller, the access point controller, and the femtocell controller may interoperate to deliver a portion of a datastream to an end-user device via one of the femtocells and delivering a remaining portion of the datastream to the end-user device via one of the WLAN access points.

Hand-offs of one or more end-user devices between one or more femtocells and/or one or more WLAN access points may be coordinated. One or more of the FC-to-WLAN network bridge and controller, the access point controller, and the femtocell controller may coordinate hand-offs of one or more end-user devices between one or more of the femtocells and one or more of the WLAN access points. The femtocell controller may be communicatively coupled to an IP backbone via a first connection and the access point controller may be communicatively coupled to the IP backbone via a second connection. A load on the first connection and/or the second connection may be balanced by the FC-to-WLAN network bridge and controller. The FC-to-WLAN network bridge and controller may manage quality of service on the first connection and/or the second connection. One or more of the FC-to-WLAN network bridge and controller, the access point controller, and the femtocell controller may determine whether a destination of the data may be reached via the FC-to-WLAN network bridge and controller or may be reached via the IP backbone. One or more of the FC-to-WLAN network bridge and controller, the access point controller, and the femtocell controller may control transmission power and/or antenna directionality of the femtocells and/or WLAN access points. One or more of the FC-to-WLAN network bridge and controller, the access point controller, and the femtocell controller may manage communication of the data based on location information associated with one or more of the network FC-to-WLAN bridge and controller, the femtocell controller, the access point controller, the one or more femtocells, and the one or more WLAN access points. The location information may be determined via one or both of input entered via a user interface and GNSS coordinates.

FIG. 1A is a diagram illustrating an exemplary multi-standard network comprising femtocells and access points, in accordance with an embodiment of the invention. Referring to FIG. 1A, there is shown a system of networks 100 comprising the wired and/or wireless communication backbone 102 and a multi-standard sub-network 118.

The multi-standard sub-network 118 comprises an access point controller 106, a femtocell controller 107, a FC-to-WLAN network bridge and controller 110, a plurality of femtocells 112a and 112b that are collectively referred to herein as femtocells 112, a plurality of access points 114a and 114b that are collectively referred to herein as APs 114, and a plurality of end-user equipment (UE) 116a . . . 116e that are collectively referred to herein as UEs 116. The UEs 116, femtocells 112a and 112b, and APs 114a and 114b may be installed in an enterprise system, commercial properties, residential properties and/or multi-tenant properties for example. The enterprise system may be deployed in office buildings, schools, hospitals or government buildings, for example. The commercial properties may comprise, for example, stores, restaurants and/or offices. The residential properties may comprise, for example, single-family homes, home offices, and/or town-houses. Multi-tenant properties may comprise residential and/or commercial tenants such as apartments, condos, hotels, and/or high rises. In various embodiments of the invention, all or a portion of the multi-standard sub-network 118 may be managed by a service provider which licenses cellular frequencies utilized by femtocells 112.

The femtocell controller 107 and the AP controller 106 may be operable to communicate with the backbone 102 via connections 101a and 101b, respectively. The connections 101a and 101b, which may be collectively references as connections 101, may comprise one or more optical, wired, and/or wireless links utilizing protocols such as Ethernet, digital subscriber line (DSL), passive optical network (PON), OC-x, Digital Video Broadcast (DVB), T1/E1, T3/E3, and WiMAX. The connections 101 may be operable to carry traffic for the femtocells 112 and the APs 114 to and/or from the wired and/or wireless communication backbone 102. For example, the connections 101 may transport IP packets to one or more of the networks 104 described with respect to FIG. 1A. In this manner, the connections 101 may provide access to the Internet and/or one or more private networks. The connections 101 may comprise one or more of optical, wired, and/or wireless links.

The AP controller 106 and the femtocell controller 107 may be operable to communicate with the FC-to-WLAN network bridge and controller 110 via connections 105a and 105b, respectively. The connections 105a and 105b, which may be collectively referenced as connections 105, may each comprise an optical and/or wired link utilizing protocols such as PON, OC-x, Ethernet, ATM, T1/E1, T3/E3 and/or one or more proprietary protocols. In some embodiments of the invention, the connections 105a and 105b may comprise a wireless communication link, for example, a WiMax communication link.

The AP controller 106 may communicate with the APs 114a and 114b via connections 108a and 108b, respectively. The connections 108a and 108b may each comprise a wired link utilizing protocols such as Ethernet, ATM, a wireless link utilizing protocols such as Wi-Fi, an optical link utilizing protocols such as PON and OC-x, or may comprise one or more optical, wired, or wireless links utilizing one or more proprietary protocols. In some embodiments of the invention, the connections 108a and 108b may comprise a wireless communication link, for example, a WiMax communication link. Exemplary wired communication links may comprise Ethernet, ATM, T1/E1 and/or T3/E3 link.

The femtocell controller 107 may be operable to communicate with the femtocells 112a and 112b via connections 109a and 109b, respectively. The connections 109a and 109b may each comprise a wired link utilizing protocols such as Ethernet, ATM, a wireless link utilizing cellular and/or WiMax protocols, an optical link utilizing protocols such as PON, or may comprise one or more optical, wired, or wireless links utilizing one or more proprietary protocols.

The AP controller 106 may comprise suitable logic, circuitry, interfaces and/or code that may be operable to control and/or manage various operational aspects of the APs 114. For example, the AP controller 106 may manage communication and/or quality of service (QoS) for traffic transported between one or both of the APs 114 and the backbone 102 via the connection 101b. In addition, the AP controller 106 may control one or more aspects of communication among the APs 114. For example, load balancing, authentication and/or security management, session initiation, session processing, resource allocation and mobility management between APs 114 may be managed by the AP controller 106. In addition, the AP controller 106 may limit or control access and/or handoffs among the APs 114 and/or other APs in other sub-networks.

The femtocell controller 107 may comprise suitable logic, circuitry, interfaces and/or code that may be operable to control and/or manage various operational aspects of the femtocells 112. For example, the femtocell controller 107 may manage communication and/or quality of service (QoS) for traffic transported between one or both of the femtocells 112 and the backbone 102 via the connection 101a. In addition, the femtocell controller 107 may control one or more aspects of communication among the femtocells 112. For example, load balancing, authentication and/or security management, call and/or session initiation, call and/or session processing, resource allocation, and mobility management between femtocells 112 may be managed by the femtocell controller 107. In addition, the femtocell controller 107 may limit or control access and/or handoffs among the femtocells 112 and/or other femtocells in other sub-networks.

The FC-to-WLAN network bridge and controller 110 may comprise suitable logic, circuitry, interfaces and/or code that may be operable to control and/or manage various operational aspects of the femtocell controller 107 and the AP controller 106. For example, the FC-to-WLAN network bridge and controller 110 may be operable to manage communication and/or quality of service (QoS) for traffic transported between the AP controller 106 and the backbone 102 via the connection 101a, and manage communication and/or quality of service (QoS) for traffic transported between the femtocell controller 107 and the backbone 102 via the connection 101b. In this regard, the FC-to-WLAN network bridge and controller 110 may be operable to communicate data between the femtocell controller 107 and the AP controller 106 which may prevent a need for some traffic to be communicated to the backbone 102. In some embodiments of the invention, management and/or control functions, such as those for performing hand-offs, QoS management, controlling access to the femtocells 112 and APs 114, and load balancing, may be offloaded from the femtocell controller 107 and/or AP controller 108 to the FC-to-WLAN bridge and controller 110. In some embodiments of the invention, management and/or control functions, may be shared between the femtocell controller 107, the AP controller 108, and the FC-to-WLAN bridge and controller 110.

The femtocells 112 may each comprise suitable logic, circuitry, and/or code that may be operable to communicate wirelessly with the UEs 116 utilizing one or more cellular standards comprising IS-95, CDMA, GSM, TDMA, GPRS, EDGE, UMTS/WCDMA, TD-SCDMA, HSDPA, extensions thereto, and/or variants thereof. Data comprises any analog and/or digital information including but not limited to voice, Internet data, and/or multimedia content. Multimedia content may comprise audio and/or visual content comprising, video, still images, animated images, and/or textual content. The femtocells 112 may each communicate with various devices such as the UEs 116. Exemplary cellular standards supported by the femtocells 112 may be specified in the International Mobile Telecomunnications-2000 (IMT-2000) standard and/or developed by the 3rd generation partnership project (3GPP) and/or the 3rd generation partnership project 2 (3GPP2). Additionally, the femtocells 112 may each comprise suitable logic, circuitry, and/or code that may be operable to communicate utilizing, for example, Internet Protocol (IP) over a wired or wireless connection 109 with the femtocell controller 107. A plurality of femtocells 112 may be operable to support simultaneous sessions of a single UE 116 or and/or multiple UEs 116. In addition, one or more femtocells 112 may be operable to support handoffs of UEs 116 with one or more APs 114. In various embodiments of the invention, the femtocells 112 may be operable to support handoff or simultaneous sessions of a single UE 116 with a femtocell in another network or sub-network (not shown).

The APs 114 comprise suitable logic, circuitry and/or code that may be operable to provide WLAN, Wi-Fi and/or WiMax connectivity to one or more of the UEs 116 utilizing standards and/or protocols such as IEEE 802.11. For example, the APs 114 may provide Internet connectivity, multimedia downloads, and/or IP telephony sessions to the UEs 116. The APs 114 may be managed by the AP controller 106 via the connections 108. A plurality of APs 114 may be operable to support simultaneous sessions and/or handoffs of a single UE 116 device. In addition, one or more APs 114 may be operable to support simultaneous sessions and/or handoffs for a single UE 116 with one or more femtocells 112. In various embodiments of the invention, the APs 114 may be operable to support handoff or simultaneous sessions of a single UE 116 with an AP in another sub-network (not shown).

The user equipment (UE) 116 may each comprise suitable logic, circuitry, and/or code that may be operable to communicate wirelessly utilizing one or more standards. For example, the UEs 116 may be operable to communicate with the APs 114 utilizing on 802.11 standards and/or variants thereof. In addition, the UEs 116 may be operable to communicate with the femtocells 112 utilizing one or more wireless standards such as IS-95, CDMA, EVDO, GSM, TDMA, GPRS, EDGE, UMTS/WCDMA, TD-SCDMA, HSDPA, WiMax and/or LTE. In addition, the UEs 116 may be operable to communicate based on Bluetooth, Zigbee and/or other wireless technologies. The UEs 116 may each be operable to transmit and/or receive data via femtocells 112 and/or APs 114 in the multi-standard sub-network 118 as well as with other cellular base stations and/or APs. Exemplary UEs 116 may comprise laptop computers, mobile phones, media players, video and/or still cameras, game consoles and/or location determination enabled devices. The UEs 116 may be enabled to receive, process, and present multimedia content and may additionally be enabled run a web browser or other applications for providing Internet services to a user of the UEs 116.

In various embodiments of the invention, the UEs 116 may be multimode devices that may be operable to communicate simultaneously with a one or more femtocells 112, one or more APs 114, or a combination thereof. For example, the UE 116b may be enabled to communicate simultaneously with the femtocell 112a and the AP 114a. Alternatively, the UEs 116 may be enabled to communicate simultaneously with a plurality of femtocells 112 or simultaneously with a plurality of APs 114. Moreover, the UEs 116 devices may be operable to perform handoffs, for example, between multiple femtocells 112, between femtocells 112 and APs 114, and/or between multiple APs 114.

The wired and/or wireless communication backbone 102 may comprise suitable logic, circuitry and/or code that may be operable to provide access to a plurality of networks, for example, a cellular network 104a, a public switched telephone network (PSTN) 104b, an IP network 104c, and/or a WiMax network 104d. The wired and/or wireless communication backbone 102 and/or the networks 104 may comprise various endpoint and/or user equipment devices. Exemplary devices of the various networks 104 may comprise a cellular base station 122 of the cellular network 104a, a telephone 124a of the PSTN 104b, a WiMAX base station 122 of the WiMAX network 104d, and a laptop 124c and application server 124b of the IP network 104c. In this regard, the cellular base station 126, telephone 124a, WiMAX base station 122, laptop 124b, and/or the application server 124c may be accessible to devices within the sub-network 118 via the wired and/or wireless communication backbone 102. In addition, the wired and/or wireless backbone 102 may be communicatively coupled to, for example, other sub-networks and/or private intranets (not shown). Accordingly, the wired and/or wireless communication backbone 102 may enable the UEs 116 to communicate with remote resources such as other user equipment, an application server on the Internet and other network devices that may be communicatively coupled via the networks 104 for example.

In operation, the AP controller 106, the femtocell controller 107, and the FC-to-WLAN network bridge and controller 110 may interoperate to manage communication among the UEs 116 and between the UEs 116 and one or more of the networks 104 within the wired and/or wireless communication backbone 102. In an exemplary embodiment of the invention, UE 116c may communicate with the UE 116d and the traffic may be routed via the connections 105 instead of the connections 101. In another exemplary embodiment of the invention, the UE 116b may wish to communicate data to the laptop 124c, however the link 101a may be congested or otherwise undesirable for delivering the data. In such an instance, the data may be routed to the IP network 104c via the connections 109b, 105b, 105a, and 101b. In this manner, the AP controller 106, the femtocell controller 107, and the FC-to-WLAN network bridge and controller 110 may interoperate to manage bandwidth and/or QoS on the connections 101.

In various embodiments of the invention, the FC-to-WLAN network bridge and controller 110 may control and/or manage operations of the femtocell controller 107 and the AP controller 106 to balance the load on the APs 114 and femtocells 112. In this regard, the AP controller 106, the femtocell controller 107, and/or the FC-to-WLAN network bridge and controller 110 may be operable to determine whether one or more femtocells 112 or APs 114 are over loaded, and such information may be communicated among various devices of the sub-network 118. An overloaded condition may be indicated by exemplary factors comprising traffic load, number of connections, congestion, insufficient bandwidth, CPU usage, and/or memory usage. Such information may be utilized to automatically hand-off one or more UEs 116 from an AP 114 to a femtocell 112 or from a femtocell 112 to an AP 114. This information may also be utilized to recommend that one or more UEs 116 switch from an AP 114 to a femtocell 112 or visa-versa. In various embodiments of the invention, AP controller 106, the femtocell controller 107, and/or the FC-to-WLAN network bridge and controller 110 may interoperate to provide authentication and/or security management, establishment of calls and/or sessions, call and/or session processing, resource allocation and mobility management based on information exchanged over the connections 105.

Various parameters may be communicated by the FC-to-WLAN network bridge and controller 110 to the femtocell controller 107 and/or the AP controller 106. Exemplary parameters may comprise a data rate, a modulation scheme, resource allocation, error coding schemes, and transmission power levels. In addition, information fed back to the FC-to-WLAN network bridge and controller 110 may comprise a round trip path delay, received signal strength information at a femtocell 112 and/or AP 114, received signal strength information at a UE 116, measured interference at a femtocell 112 and/or AP 114, measured interference at a UE 116, bit error rates at a femtocell 112 and/or AP 114, bit error rates at a UE 116, available bandwidth of a femtocell 112 and/or AP 114 and/or available bandwidth of a UE 116. Information that may be fed back may also comprise an indication of past, current and/or predicted traffic load, number of connections, congestion, insufficient bandwidth, CPU usage, and/or memory usage. In addition, timing information and/or location of one or more UEs 116, femtocells 112 and/or APs 114 may be provided. For example, global navigation satellite system (GLASS) timing and/or location coordinates may be communicated to and/or from the FC-to-WLAN network bridge and controller 110. Additionally, feedback from a UE 116, femtocell 112, and/or AP 114 to the AP controller 106, the femtocell controller 107, and/or the FC-to-WLAN network bridge and controller 110 may indicate the capabilities of the devices to the AP controller 106, the femtocell controller 107, and/or the FC-to-WLAN network bridge and controller 110. Exemplary capabilities which may be communicated may comprise a hardware configuration, a software configuration, maximum transmit power, and battery strength. In this regard, the AP controller 106, the femtocell controller 107, and/or the FC-to-WLAN network bridge and controller 110 may interoperate to manage calls and/or sessions within the multi-standard sub-network 118 based on feedback received from the femtocells 112, APs 114 and UEs 116.

Figure 1B:
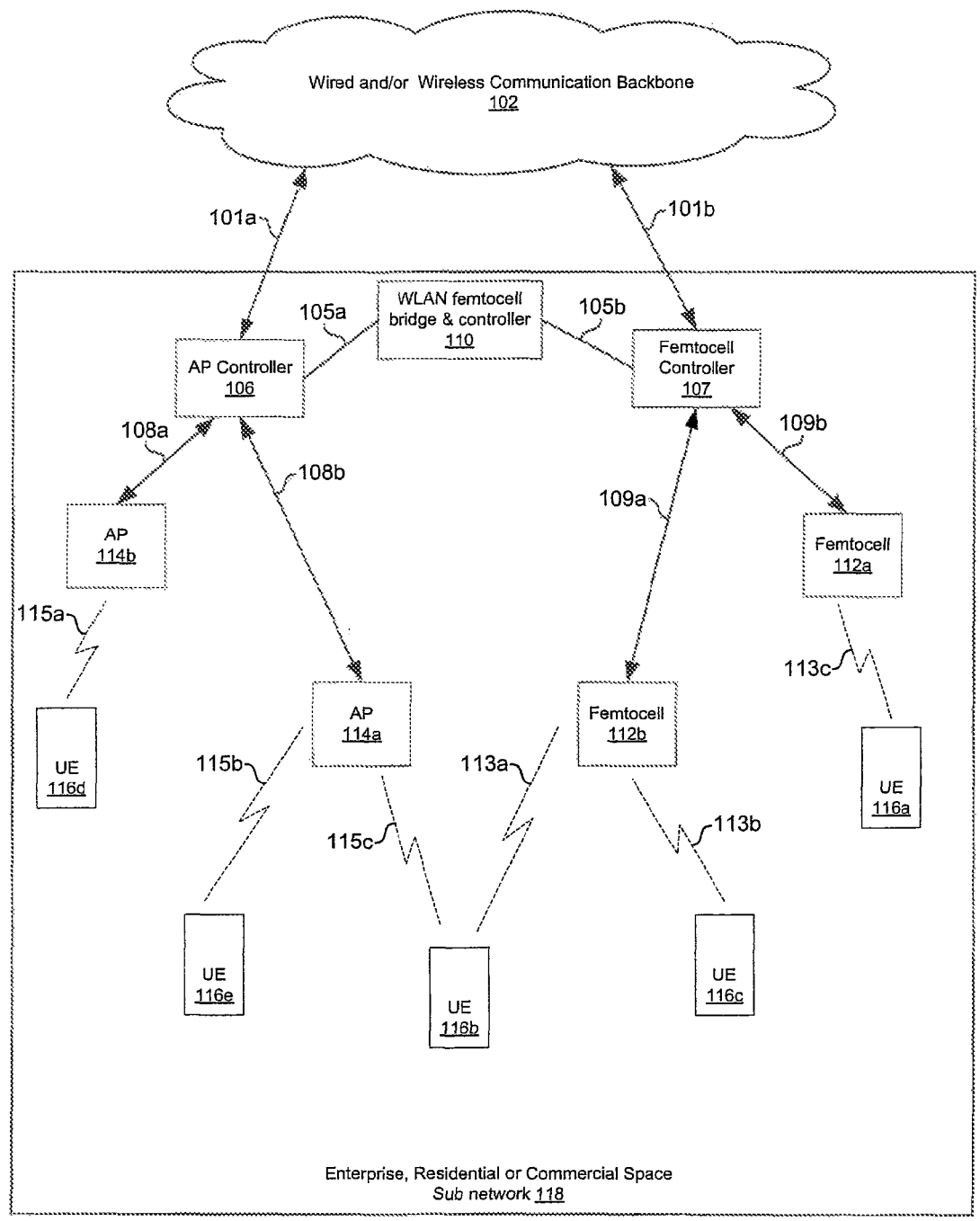
FIG. 1B is a block diagram illustrating exemplary details of a FC-to-WLAN network comprising femtocells, access points, and a FC-to-WLAN network bridge and controller, in accordance with an embodiment of the invention.

FIG. 1B is a block diagram illustrating exemplary details of a multi-standard network comprising femtocells, access points, and a FC-to-WLAN network bridge and controller, in accordance with an embodiment of the invention. Referring to FIG. 1B, there is shown the wired and/or wireless communication backbone 102, the AP controller 106, the femtocell controller 107, FC-to-WLAN network bridge and controller 110, the femtocells 112a and 112b, the APs 114a and 114b, the UEs 116, the connections 101a and 101b, the connections 105a and 105b, the connections 108a and 108b, and the connections 109a and 109b all of which may be as described with respect to FIG. 1A.

Also shown are connections 115a, ..., 115c between the APs 114 and some of the UEs 116 and the connections 113a ... 113b between the femtocells 112 and some of the UEs 116. The connections 113a ... 113b, which may be collectively referenced as connections 113, may each comprise a wireless link utilizing cellular protocols. The connections 115a ... 115b, which may be collectively referenced as connections 115, may each comprise a wireless link utilizing IEEE 802.11, or similar, protocols.

In operation, the AP controller 106, the femtocell controller 107, and the FC-to-WLAN network bridge and controller 110 may interoperate to manage communication that is handled by the femtocells 112 and/or the APs 114. For example, the AP 114a and the femtocell 112b may communicate parameters about their usage to the AP controller 106 and femtocell controller 107, respectively. The AP controller 106 and femtocell controller 107 may forward the parameters to the FC-to-WLAN network bridge and controller 110. Exemplary usage parameters for a UE 116 may comprise requested and/or required bandwidth of the UE 116, type of data requested and/or being communicated to the UE 116, location of the UE 116, received cellular signal strength of the UE 116, and received WLAN signals strength of the UE 116. The AP controller 106 and the femtocell controller 107 may also communicate parameters about their own operation to the FC-to-WLAN network bridge and controller 110. Exemplary operating parameters of the AP controller 106 may comprise available bandwidth for one or more of the connections 101a, 105a, 108a, and 108b; number of APs 114 communicatively coupled to the AP controller 106; and types of data requested and/or being communicated by the AP controller 106. Exemplary operating parameters of the femtocell controller 107 may comprise available bandwidth for one or more of the connections 101b, 105b, 109a, and 109b; number of femtocells 112 communicatively coupled to the AP controller 106; and/or types of data requested and/or being communicated by the AP controller 106. The FC-to-WLAN network bridge and controller 110 may then utilize the received parameters to determine how to balance the load of UE 116b between the AP 114a and the femtocell 112b. The FC-to-WLAN network bridge and controller 110 may communicate the determination to the AP controller 106 and the femtocell controller 107, which may, in turn, communicate the determination to the APs 114 and the femtocells 112.

In addition, the AP controller 106, the femtocell controller 107, and the FC-to-WLAN network bridge and controller 110 may interoperate to manage communication of data between the subnetwork 118 and remote endpoints via the wired and/or wireless backbone 102. For example, data received from one or more UEs 116 by the AP controller 106 may be communicated to the backbone 102 via the connection 101a, or, in instances that the connection 101a is congested or otherwise undesirable or unavailable, route the data to the backbone 102 via the connections 105 and 101b. Similarly, data received from one or more UEs 116 by the femtocell controller 107 may be communicated to the backbone 102 via the connection 101b, or, in instances that the connection 101b is congested or otherwise undesirable or unavailable, route the data to the backbone 102 via the connections 105 and 101a. In various embodiments of the invention, the AP controller 106, the femtocell controller 107, and the FC-to-WLAN network bridge and controller 110 may interoperate to allocate, reallocate, reserve and/or deallocate bandwidth on the connections 101 for the femtocells 112 and/or APs 114. In this regard, it may be determined which femtocell 112 and/or AP 114 may handle a call and/or session with a UE 116. In addition, the AP Controller 106, the femtocell controller 107, and the FC-to-WLAN network bridge and controller 110 may intemperate to handle quality of service (QoS) for femtocell 112 and/or AP 114 traffic that is transported via the connections 101.

In various embodiments of the invention, the UEs 116 may communicate with other user equipment and/or application servers in the networks 104 via the one or more femtocells 112 and/or APs 114, the AP controller 106, the femtocell controller 107, and the FC-to-WLAN network bridge and controller 110. For example, the UE 116c may receive a phone call from a remote landline telephone 124a in the PSTN network 104b. In this regard, the femtocell controller 107 may assign the phone call to the femtocell 112b. The femtocell 112b and the UE 116c may exchange data and/or voice via the cellular connection 113b. The femtocell 112b may packetize data received from the UE 116c into one or more IP packets and the IP packets may be further encapsulated, encoded, modulated, or otherwise processed. The IP packets may then be routed via the connection 109a to the femtocell controller 107. The femtocell controller 107 may analyze bandwidth and/or QoS levels for the IP packets to the backbone 102 and for IP packets from the IP backbone, and may enable routing the packets via the connection 101b and/or the connections 105 and 101a.

In another exemplary embodiment of the invention, the UE 116b may be operable to initiate a connection with an application server on the Internet to download and/or upload multimedia data via the backbone 102. The AP controller 106 may determine that the AP 114a may handle the connection and the UE 116b and AP 114a may exchange data utilizing one or more 802.11 standards. The AP 114a may send or receive the data to and/or from the AP controller 106 via the connection 108b. The AP controller 106 may route the data to the appropriate destination in the backbone 102 via the broadband link 101a or via the connections 105, the FC-to-WLAN, network bridge and controller 110, the femtocell controller 107, and the connection 101b. In various embodiments of the invention, the AP controller 106 may be operable to route the multimedia to a plurality of the UEs 116. Moreover, multimedia may be routed from the AP controller 106 to one or more femtocells 112 via the FC-to-WLAN network bridge and controller 110 and the femtocell controller 107. In this regard, a portion of a datastream may be delivered to the UE 116b via the AP 114a and a remaining portion of the datastream may be delivered to the UE 116b via the femtocell 112b.

In another exemplary embodiment of the invention, the UE 116a may be operable to initiate a voice over IP connection with a remote end-user device in one of the networks 104 via the backbone 102. The femtocell controller 107 may determine that the femtocell 112a may handle the connection and the UE 116a and femtocell 112a may exchange data utilizing one or more cellular standards. The femtocell 112a may send or receive the data to and/or from the femtocell controller 107 via the connection 109b. The femtocell controller 107 may route the data to the appropriate destination in the backbone 102 via the broadband link 101b or via the connections 105, the FC-to-WLAN network bridge and controller 110, the AP controller 106, and the connection 101b. In various embodiments of the invention, the femtocell controller 107 may be operable to route the multimedia to a plurality of the UEs 116. Moreover, multimedia information may be routed from the femtocell controller 107 to one or more APs 114 via the FC-to-WLAN network bridge and controller 110 and the AP controller 106. In this regard, a portion of a datastream may be delivered to the UE 116b via the AP 114a and a remaining portion of the datastream may be delivered to the UE 116b via the femtocell 112b. For example, a multimedia stream with a high data rate may be too large to deliver in a timely manner over only the cellular connection 113a and thus a portion of the datastream may be delivered over the WLAN connection 115c. Similarly, security and/or control information to enable decoding and presenting multimedia content may be communicated over the cellular connection and the corresponding multimedia content may be delivered over the WLAN connection 115c.

Figure 2A:
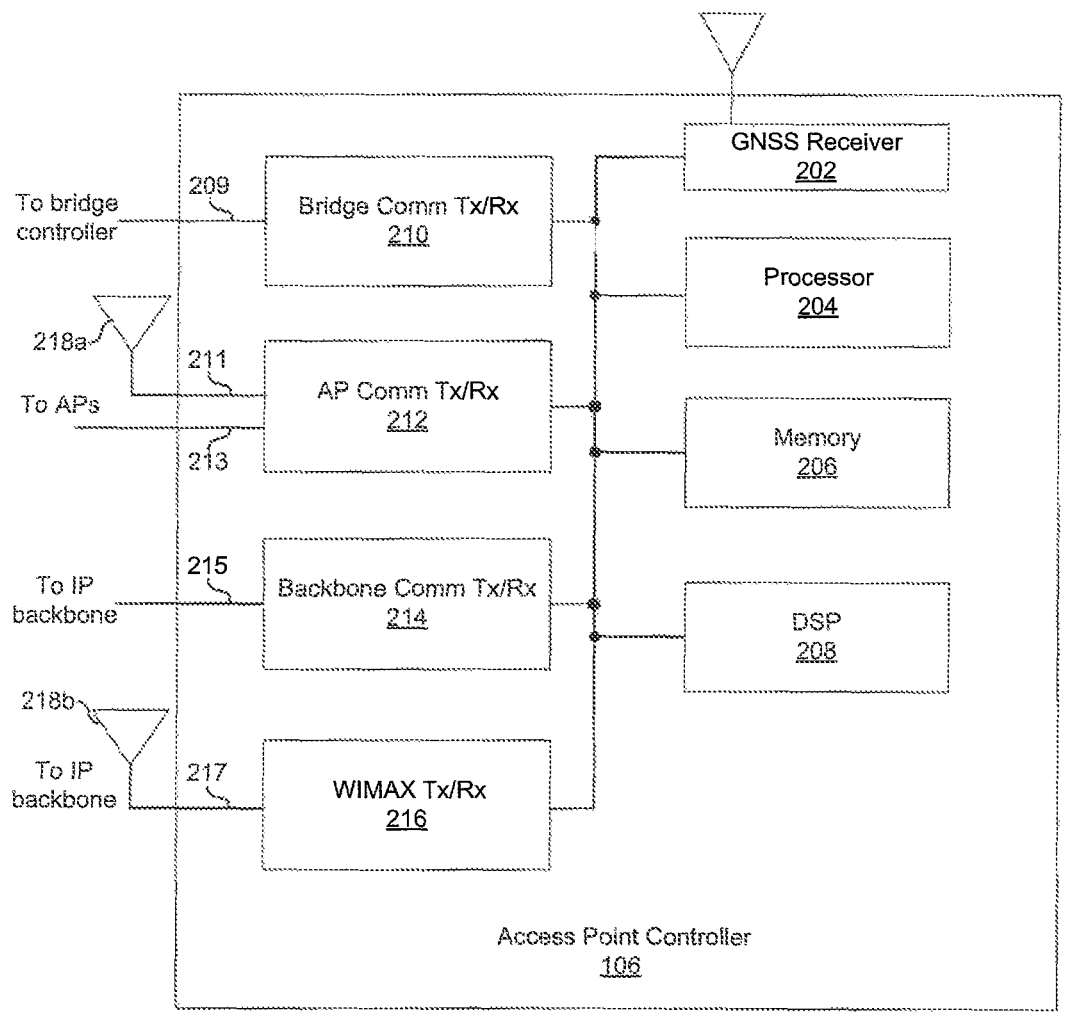
FIG. 2A is a block diagram of an exemplary access point (AP) controller, in accordance with an embodiment of the invention.

FIG. 2A is a block diagram of an exemplary AP controller, in accordance with an embodiment of the invention. Referring to FIG. 2A, the AP controller 106 may comprise a GNSS receiver 202, a processor 204, a memory 206, a DSP 208, a FC-to-WLAN network bridge and controller communications (HNB comm) transmitter and/or receiver (Tx/Rx) 210, an AP communications Tx/Rx 212, a backbone communications Tx/Rx 214, and a WiMAX Tx/Rx 216.

The GNSS receiver 202 may comprise suitable logic, circuitry and/or code to receive signals from one or more GNSS satellites, for example, GPS satellites. The received signals may comprise timing, ephemeris, long term orbit information, and/or almanac information that enable the GNSS receiver 168 to determine its location and/or time. GNSS coordinates determined based on received GNSS signals may be utilized in managing communications by the AP controller 106. Determined GNSS coordinates may be communicated to other devices in a network such as the FC-to-WLAN network bridge and controller 110 and the femtocell controller 107. Accordingly, the location of the AP controller 106 may be a determining factor in deciding how to manage data communicated in a FC-to-WLAN network such as the subnetwork 118.

The processor 204 may comprise suitable logic, circuitry, and/or code that may enable processing data and/or controlling operations of the AP controller 106. In this regard, the processor 204 may be enabled to provide control signals to the various other blocks within the AP controller 106. The processor 204 may also control data transfers between various portions of the AP controller 106. Additionally, the processor 204 may enable execution of applications programs and/or code. In various exemplary embodiments of the invention, the applications, programs, and/or code may enable, for example, parsing, transcoding, or otherwise processing data. In various embodiments of the invention, the applications, programs, and/or code may enable, for example, configuring and/or controlling operation of the HNB communication, Tx/Rx 210, AP communications Tx/Rx 212, the backbone communications Tx/Rx 214, and the WiMAX Tx/Rx 216. For example, transmission power levels may be configured and/or transmission times may be scheduled. In various embodiments of the invention, the processor 204 may manage communication of data and/or QoS for data communicated to the FC-to-WLAN network bridge and controller 110, APs 114, and/or backbone 102. In various embodiments of the invention, the processor 204 may generate and/or process control information received from, or to be transmitted to, the APs 114 and/or the UEs 116. In this regard, the processor 204 may be enabled to control or 'manage communication between the APs 114 and the UEs 116. For example, the processor 204 may determine and communicate control parameters such as power level, modulation schemes, error coding schemes, and/or data rates.

The memory 206 may comprise suitable logic, circuitry, and/or code that may enable storage or programming of information that includes, for example, parameters and/or code that may effectuate the operation of the AP controller 106. Parameters may comprise configuration data and the code may comprise operational code such as software and/or firmware, but the information need not be limited in this regard. Moreover, the parameters may include adaptive filter and/or block coefficients. Additionally, the memory 206 may buffer or otherwise store received data and/or data to be transmitted. In various embodiments of the invention, the memory 206 may comprise QoS and/or control parameters for traffic managed by the AP controller 106. In addition, one or more look-up tables, which may be utilized for determining UEs 116 to be serviced by the APs 114, may be stored in the memory 206.

The DSP 208 may comprise suitable logic, circuitry, and/or code that may be operable to perform computationally intensive processing of data. In various embodiments of the invention, the DSP 208 may be operable to handle exemplary operations comprising encoding, decoding, modulating, demodulating, encryption, decryption, scrambling, descrambling, and/or otherwise processing of data. In various embodiments of the invention, the DSP 208 may be enabled to calculate and adjust parameters such as transmitted signal strength, antenna directionality, and data rate of communication of the APs 114.

The HNB communication Tx/Rx 210 may comprise suitable logic, circuitry, and/or code that may be operable to transmit and/or receive data to and/or from the FC-to-WLAN network bridge and controller 110 via the interface 209. The FC-to-WLAN network bridge and controller communications Tx/Rx 210 may be operable to perform exemplary operations or functions comprising amplification, down-conversion, filtering, demodulation, and analog to digital conversion of received signals and/or signals to be transmitted. In various exemplary embodiments of the invention, a connection 105a (FIG. 1B) to the FC-to-WLAN network bridge and controller 110 may be established via the interface 209, which may wired, wireless, or optical and utilize protocols such as Ethernet, digital subscriber line (DSL), passive optical network (PON), Digital Video Broadcast (DVB), T1/E1, and WiMAX.

The AP communications Tx/Rx 212 may comprise suitable logic, circuitry, and/or code that may be operable to transmit and/or receive data to and/or from one or more APs 114 via a wireless interface 211 and/or a wired or optical interface 212. The AP communications Tx/Rx 212 may be operable to perform exemplary operations or functions comprising amplification, down-conversion, filtering, demodulation, and analog to digital conversion of received signals and/or signals to be transmitted. In various exemplary embodiments of the invention, a connection 115 (FIG. 1B) to one or more APs 114 may be established via the interface 211 and/or 213 utilizing protocols such as such as Ethernet, digital subscriber line (DSL), passive optical network (PON), Digital Video Broadcast (DVB), and T1/E1. The AP communications Tx/Rx 212 may transmit and receive via an antenna 218a and antenna directionality may be controlled via one or more control signals and/or based on received control data. Additionally, transmitted signal strength of the AP communications Tx/Rx 212 may be controlled via one or more control signals and/or based on received control data.

The backbone communications Tx/Rx 214 may comprise suitable logic, circuitry, and/or code that may be operable to transmit and/or receive data to and/or from the backbone 102 via a wired or optical interface 215. The backbone communications Tx/Rx 214 may be operable to perform exemplary operations or functions comprising amplification, down-conversion, filtering, demodulation, and analog to digital conversion of received signals and/or signals to be transmitted. In various exemplary embodiments of the invention, a connection 101a (FIG. 1B) to the backbone 102 may be established via the interface 215 utilizing protocols such as such as Ethernet, digital subscriber line (DSL), passive optical network (PON), OX-x, Digital Video Broadcast (DVB), T1/E1, T3/E3, and WiMAX.

The WiMax Tx/Rx 216 may comprise suitable logic, circuitry, and/or code that may be operable to transmit and/or receive data to and/or from a WiMax base station and/or the WiMax network 104d in the wired and/or wireless communication backbone 102. The WiMax Tx/Rx 216 may be operable to perform amplification, down-conversion, filtering, demodulation, and analog to digital conversion of received signals and/or signals to be transmitted. The WiMAX Tx/Rx 216 may receive RF signals and output baseband signals to one or more other portions of the AP controller 106. The WiMAX Tx/Rx 216 may receive baseband signals from one or more other portions of the AP controller 106 and generate and transmit corresponding RF signals. The WiMAX Tx/Rx 216 may transmit and receive via an antenna 218b and antenna directionality may be controlled via one or more control signals and/or based on received control data. Additionally, transmitted signal strength of the WiMAX Tx/Rx 216 may be controlled via one or more control signals and/or based on received control data.

In operation, the AP controller 106 may allocate bandwidth on the connection 101a for the APs 114. In this regard, the AP controller 106 may be operable, possibly with the aid of communication with the femtocell controller 107 and/or the FC-to-WLAN network bridge and controller 110, to determine which AP 114 may handle a call and/or session with the UEs 116. In addition, the AP controller 106 may, for example, with the aid of communication with the femtocell controller 107 and/or the FC-to-WLAN network bridge and controller 110, manage quality of service (QoS) for AP 114 traffic that is transported to the backbone 102 via the interface 215. In various embodiments of the invention, the AP controller 106 may communicate control information to the APs 114 and receive measurements and/or status from them. For example, the APs 114 may communicate received signal strengths, RF interference and/or bandwidth availability that may be utilized to determine new operating parameters and/or how to assign new calls and/or communication sessions. In this regard, the AP controller 106 may enable management of communication between APs 114 and various UEs 116. Additionally, the AP controller 106 may send and receive control information to and from the FC-to-WLAN network bridge and controller 110.

In various embodiments of the invention, the AP controller 106 may be controlled and/or configured via a user interface. For example, a user may log into the AP controller 106 via a web browser. In this regard, a user interface may enable a network administrator to configure parameters such as antenna directionality, frequencies of operation, transmit power, permissions, and security settings. The user interface may also enable the administrator to enter location information of the AP controller 106. In this regard, a network administrator may enter, for example, a canonical name to be associated with the AP controller 106, a street address for the location of the AP controller 106, and/or a building or location name in an enterprise system. The location information may be communicated among the WLAN access point 106, the femtocell controller 107, and the network FC-to-WLAN bridge and controller 110. Additionally or alternatively, the location information may be managed hierarchically. In this regard, the AP controller 106 may determine and store location information for APs 114 with which it communicates. The AP controller 106 may communicate its location information and the location information for the APs 114 to the FC-to-WLAN network bridge and controller 110. Accordingly, the FC-to-WLAN network bridge and controller 110 may store location information for each AP controller 106 with which it communicates.

Figure 2B:
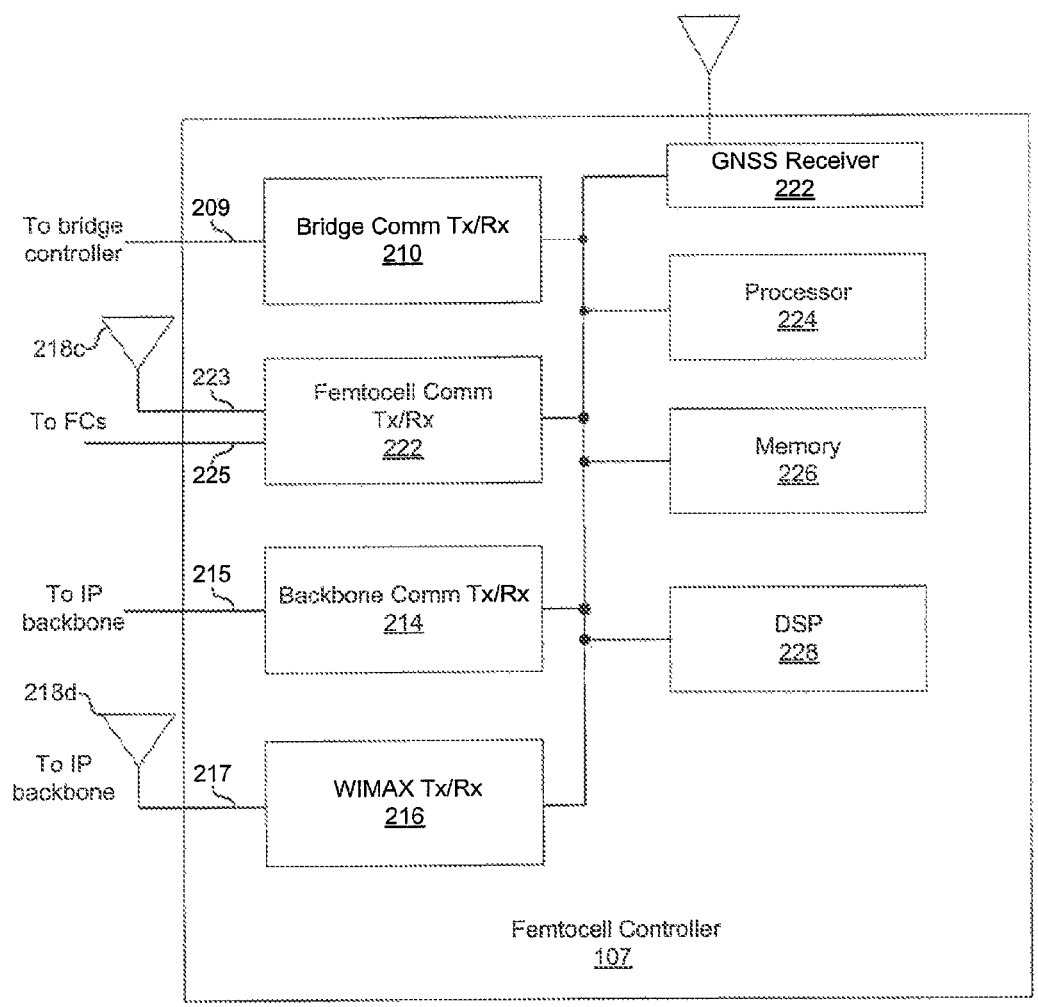
FIG. 2B is a block diagram of an exemplary femtocell controller, in accordance with an embodiment of the invention.

FIG. 2B is a block diagram of an exemplary femtocell controller, in accordance with an embodiment of the invention. Referring to FIG. 2B, the femtocell controller 107 may comprise a GNSS receiver 222, a processor 224, a memory 226, a DSP 228, a FC-to-WLAN network bridge communications Tx/Rx 210, an femtocell communications Tx/Rx 222, a backbone communications Tx/Rx 214, and a WiMAX Tx/Rx 216.

The FC-to-WLAN network bridge communications Tx/Rx 210, the backbone communications Tx/Rx 214, and the WiMAX Tx/Rx 216 may be as described with respect to FIG. 2A. The processor 224, the memory 226, and the DSP 228 may be substantially similar to the processor 204, memory 206, and DSP 208, respectively, described with respect to FIG. 1B.

The GNSS receiver 222 may be similar to the GNSS receiver 202 described with respect to FIG. 2A. GNSS coordinates determined based on received GNSS signals may be utilized in managing communications by the femtocell controller 107. Determined GNSS coordinates may be communicated to other devices in a network such as the FC-to-WLAN network bridge and controller 110 and the AP controller 106. Accordingly, the location of the femtocell controller 107 may be a determining factor in deciding how to manage data communicated in a FC-to-WLAN network such as the sub-network 118 (FIG. 1B).

The femtocell communications Tx/Rx 222 may comprise suitable logic, circuitry, and/or code that may be operable to transmit and/or receive data to and/or from one or more femtocells 112 via a wireless interface 223 and/or a wired or optical interface 225. The femtocell communications Tx/Rx 222 may be operable to perform exemplary operations or functions comprising amplification, down-conversion, filtering, demodulation, and analog to digital conversion of received signals and/or signals to be transmitted. In various exemplary embodiments of the invention, a connection 113 (FIG. 1B) to one or more femtocells 112 may be established via the interface 223 and/or 225 utilizing cellular protocols and/or non-cellular protocols such as such as Ethernet, digital subscriber line (DSL), passive optical network (PON), OC-x, Digital Video Broadcast (DVB), T1/E1, and T3/E3. The femtocell communications Tx/Rx 222 may transmit and receive via an antenna 218c and antenna directionality may be controlled via one or more control signals and/or based on received control data. Additionally, transmitted signal strength of the femtocell communications Tx/Rx 222 may be controlled via one or more control signals and/or based on received control data.

In operation, the femtocell controller 107 may allocate bandwidth on the connection 101b for the femtocells 112. In this regard, the femtocell controller 107 may be operable, for example, with the aid of communication with the AP controller 106 and/or the FC-to-WLAN network bridge and controller 110, to determine which femtocell 112 may handle a call and/or session with the UEs 116. In addition, the femtocell controller 107 may manage, for example, with the aid of communication with the AP controller 106 and/or the FC-to-WLAN network bridge and controller 110, quality of service (QoS) for femtocell traffic that is transported to the backbone 102 via the interface 215. In various embodiments of the invention, the femtocell controller 107 may communicate control information to the femtocells 112 and receive measurements and/or status from them. For example, the femtocells 112 may communicate received signal strengths, RF interference and/or bandwidth availability that may be utilized to determine new operating parameters and/or how to assign new calls and/or communication sessions. In this regard, the femtocell controller 107 may enable management of communication between femtocells 112 and various UEs 116. Additionally, the femtocell controller 107 may send and receive control information to and from the FC-to-WLAN network bridge and controller 110.

In various embodiments of the invention, the AP controller 106 may be controlled and/or configured via a user interface. For example, a user may log into the AP controller 106 via a web browser. In this regard, a user interface may enable a network administrator to configure parameters such as antenna directionality, frequencies of operation, transmit power, permissions, and security settings. The user interface may also enable the administrator to enter location information of the AP controller 106. In this regard, a network administrator may enter, for example, a canonical name to be associated with the AP controller 106, a street address for the location of the AP controller 106, and/or a building or location name in an enterprise system. The location information may be communicated among the WLAN access point 106, the femtocell controller 107, and the network FC-to-WLAN bridge and controller 110. Additionally or alternatively, the location information may be managed hierarchically. In this regard, the femtocell controller 107 may determine and store location information for femtocells 112 with which it communicates. The femtocell controller 107 may communicate its location information and the location information for the femtocells 112 to the FC-to-WLAN network bridge and controller 110. Accordingly, the FC-to-WLAN network bridge and controller 110 may store location information for each femtocell controller 107 with which it communicates.

Figure 2C:
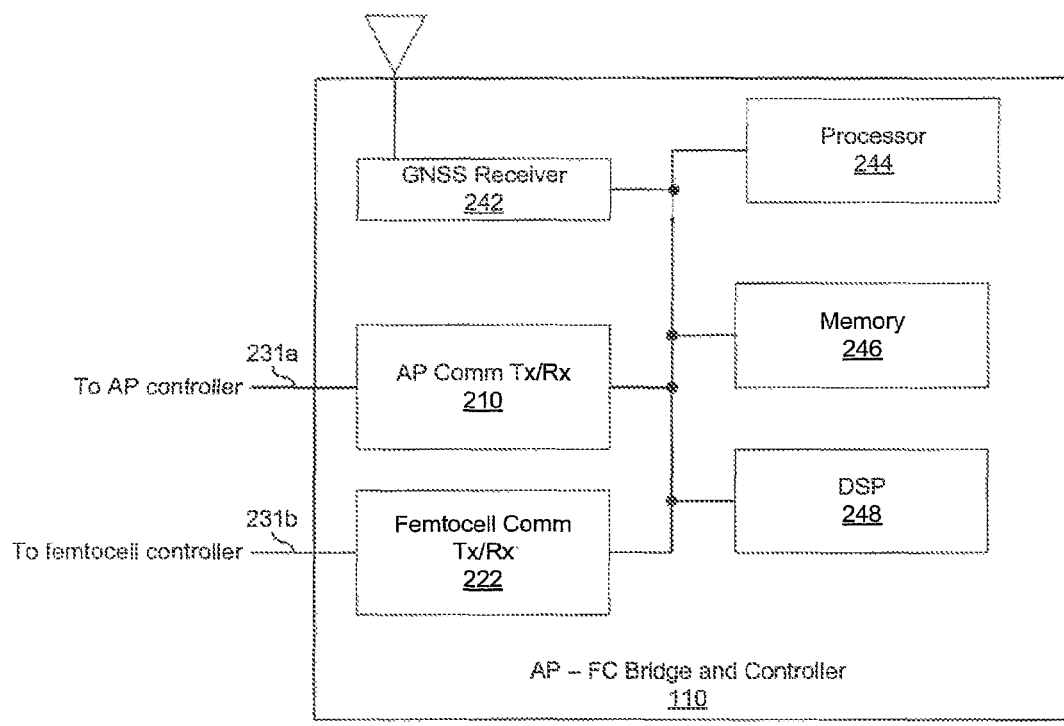
FIG. 2C is a block diagram of an exemplary FC-to-WLAN network bridge and controller, in accordance with an embodiment of the invention.

FIG. 2C is a block diagram of an exemplary FC-to-WLAN network bridge, in accordance with an embodiment of the invention. Referring to FIG. 2C, the FC-to-WLAN network bridge and controller 110 may comprise a GNSS receiver 202, a processor 244, a memory 246, a DSP 248, an AP communications Tx/Rx 210, and a femtocell communications Tx/Rx 222.

The AP communications Tx/Rx 210 may be as described with respect to FIG. 2A. The femtocell communications Tx/Rx 222 may be as described with respect to FIG. 2B.

The GNSS receiver 242 may be similar to the GNSS receiver 202 described with respect to FIG. 2A. GNSS coordinates determined based on received GNSS signals may be utilized in managing communications by the FC-to-WLAN network switch 110. Determined GNSS coordinates may be communicated to other devices in a network such as the femtocell controller 107 and the AP controller 106. Accordingly, the location of the FC-to-WLAN network bridge and controller 110 may be a determining factor in deciding how to manage data communicated in a FC-to-WLAN network such as the sub-network 118 (FIG. 1B).

The processor 244 may comprise suitable logic, circuitry, and/or code that may enable processing data and/or controlling operations of the FC-to-WLAN network bridge and controller 110. In this regard, the processor 244 may be enabled to provide control signals to the various other blocks within the FC-to-WLAN network bridge and controller 110. The processor 244 may also control data transfers between various portions of the FC-to-WLAN network bridge and controller 110. Additionally, the processor 244 may enable execution of applications programs and/or code. In various exemplary embodiments of the invention, the applications, programs, and/or code may enable, for example, parsing, transcoding, or otherwise processing data. In various embodiments of the invention, the applications, programs, and/or code may enable, for example, configuring and/or controlling operation of the AP communications Tx/Rx 210 and femtocell communications Tx/Rx 222. Moreover, the applications, programs, and/or code may utilize parameters or control information received from the AP controller 106 and the femtocell controller 107 to manage a configuration of, operation of, or communications with the AP controller 106 and the femtocell controller 107. For example, transmission power levels for wireless interfaces of the AP controller 106, femtocell controller 107, APs 114, and/or femtocells 112 may be configured. Similarly, transmission times for optical, wired, and/or wireless interfaces of the AP controller 106, femtocell controller 107, APs 114, and/or femtocells 112 may be scheduled.

In various embodiments of the invention, the processor 244 may be operable to manage communication of data and/or QoS for data communicated via the interfaces 231a and 231b to the AP controller 106 and the femtocell controller 107. In various embodiments of the invention, the processor 244 may generate and/or process control information received from, or to be transmitted to, the APs 114 and/or the UEs 116. In this regard, the processor 244 may be enabled to control or manage communication among the AP controller 106 the femtocell controller 107, the APs 114, the femtocells 112, and the UEs 116.

The memory 246 may comprise suitable logic, circuitry, and/or code that may enable storage or programming of information that includes, for example, parameters and/or code that may effectuate the operation of the FC-to-WLAN network bridge and controller 110. Parameters may comprise configuration data and the code may comprise operational code such as software and/or firmware, but the information need not be limited in this regard. Moreover, the parameters may include adaptive filter and/or block coefficients. Additionally, the memory 246 may buffer or otherwise store received data and/or data to be transmitted. In various embodiments of the invention, the memory 246 may comprise QoS and/or control parameters for traffic managed by the FC-to-WLAN network bridge and controller 110. In addition, one or more look-up tables, which may be utilized to determine the UEs 116 within a coverage area of the APs 114 and the UEs 116 that are within a coverage area of the femtocells 112, may be stored in the memory 246. The memory 246 may also store operating parameters determined for, or received from, one or more of the AP controller 107, the femtocell controller 107, APs 114, and femtocells 112.

The DSP 248 may comprise suitable logic, circuitry, and/or code that may be operable to perform computationally intensive processing of data. In various embodiments of the invention, the DSP 248 may be operable to handle exemplary operations comprising encoding, decoding, modulating, demodulating, encryption, decryption, scrambling, descrambling, and/or otherwise processing of data. In various embodiments of the invention, the DSP 248 may be enabled to calculate and adjust parameters such as transmitted signal strength, antenna directionality, and data rate of communication of the AP controller 106, the femtocell controller 107, the APs 114, and/or the femtocells 112.

In operation, the FC-to-WLAN network bridge and controller 110 may allocate bandwidth on the connections 101a and 101b for the APs 114 and the femtocells 112. In this regard, the FC-to-WLAN network bridge and controller 110 may enable determination of which AP 114 or femtocell 112 may handle a call and/or session with a UE 116. In addition, the FC-to-WLAN network bridge and controller 110 may manage quality of service (QoS) for femtocell and AP traffic that is transported to the backbone 102 via the AP controller 106 and the femtocell controller 107. In various embodiments of the invention, the FC-to-WLAN network bridge and controller 110 may communicate control information to the AP controller 106 and the femtocell controller 107 and receive measurements and/or status from them. For example, the AP controller 106 and the femtocell controller 107 may communicate received signal strengths, RF interference and/or bandwidth availability that may be utilized to determine new operating parameters and/or how to assign new calls and/or communication sessions. In this regard, the FC-to-WLAN network bridge 110 may manage communication among femtocells 112, among APs 114 and between femtocells 112 and APs 114.

In various embodiments of the invention, the FC-to-WLAN network bridge and controller 110 may be controlled and/or configured via a user interface. For example, a user may log into the FC-to-WLAN network bridge and controller 110 via a web browser. In this regard, a user interface may enable a network administrator to configure parameters such as antenna directionality, frequencies of operation, transmit power, permissions, and security settings. The user interface may also enable the administrator to enter location information of the FC-to-WLAN network bridge and controller 110. In this regard, a network administrator may enter, for example, a canonical name to be associated with the FC-to-WLAN network bridge and controller 110, a street address for the location of the FC-to-WLAN network bridge and controller 110, and/or a building or location name in an enterprise system. The location information may be communicated among the WLAN access point 106, the femtocell controller 107, and the network FC-to-WLAN bridge and controller 110. Additionally or alternatively, the location information may be managed hierarchically. In this regard, the femtocell controller 107 and the AP controller 106 may determine and store location information for femtocells 112 and APs 114 with which they communicate, respectively. Furthermore, the femtocell controller 107 and the AP controller 106 may communicate the determined femtocell and AP location information along with information about their own locations to the FC-to-WLAN network bridge and controller 110. Accordingly, the FC-to-WLAN network bridge and controller 110 may store location information for each femtocell controller 107 and AP controller with which it communicates, and the femtocells and APs with which those controllers communicate.

Figure 3A:
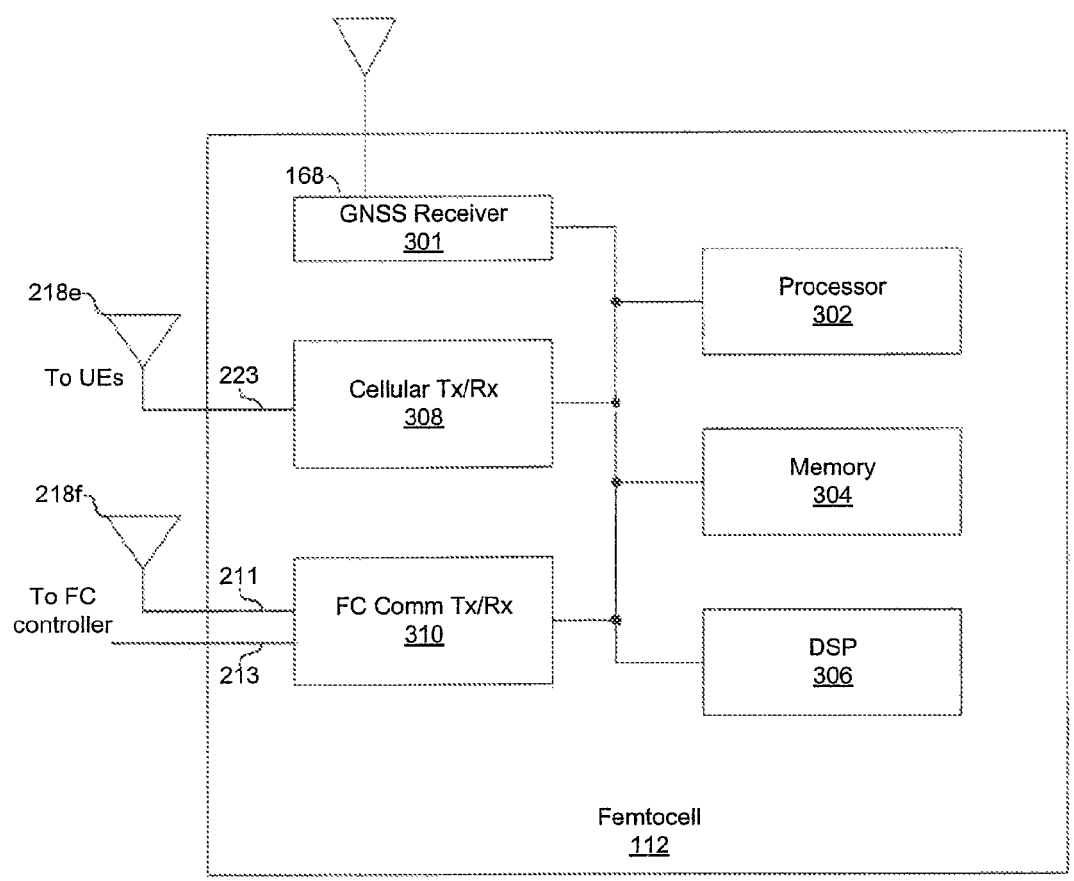
FIG. 3A is a block diagram of an exemplary femtocell, in accordance with an embodiment of the invention.

FIG. 3A is a block diagram of an exemplary femtocell, in accordance with an embodiment of the invention. Referring to FIG. 3A, there is shown a femtocell 112 comprising a GNSS receiver 202, a processer 304, a memory 306, a DSP 308, a cellular Tx/Rx 308, and a femtocell controller communications (FC Comm) Tx/Rx 310. The femtocell 112 may be as described with respect to FIGS. 1A and 1B.

The FC Comm Tx/Rx 310 may be substantially similar to the femtocell communications Tx/Rx 222 described with respect to FIGS. 2B and 2C.

The GNSS receiver 301 may be similar to the GNSS receiver 202 described with respect to FIG. 2A. GNSS coordinates determined based on received GNSS signals may be utilized in managing communications by the femtocell 112. Determined GNSS coordinates may be communicated to other devices in a network such as the femtocell controller 107, the AP controller 106, and the FC-to-WLAN network bridge and controller 110. Accordingly, the location of the femtocell 112 may be a determining factor in deciding how to manage data communicated in a multi-standard network such as the sub-network 118 (FIG. 1B).

The cellular Tx/Rx 308 may comprise suitable logic circuitry and/or code that may be operable to transmit and/or receive voice and/or data utilizing one or more cellular standards. The cellular Tx/Rx 308 may be operable to perform amplification, down-conversion, filtering, demodulation, and analog to digital conversion of received cellular signals and/or cellular signals to be transmitted. The cellular Tx/Rx 308 may be operable to support communication over a plurality of communication channels utilizing time division multiple access (TDMA), code division multiple access (CDMA) and/or orthogonal frequency division multiplexing (OFDM) for example. In addition, exemplary cellular standards supported by the femtocells 112 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). In various embodiments of the invention, the cellular Tx/Rx 308 may be enabled to measure received signal strength and may adjust a power level and/or a modulation scheme or level of transmitted signals. The cellular Tx/Rx 308 may transmit and receive via an antenna 218e and antenna directionality may be controlled via one or more control signals and/or based on received control data. Additionally, transmitted signal strength of the cellular Tx/Rx 308 may be controlled via one or more control signals and/or based on received control data.

The processor 304 may comprise suitable logic, circuitry, and/or code that may enable processing data and/or controlling operations of the femtocell 112. In this regard, the processor 304 may be enabled to provide control signals to the various other blocks within the femtocell, for example the DSP 308, memory 306 and/or Tx/Rx 308. The processor 304 may also control data transfers between various portions of the femtocell 112. Additionally, the processor 304 may enable execution of applications programs and/or code. In various embodiments of the invention, the applications, programs, and/or code may enable, for example, parsing, transcoding, and/or otherwise processing data. In various embodiments of the invention, the applications, programs, and/or code may enable, for example, configuring or controlling operation of the cellular transmitter and/or receiver 308, the broadband transmitter and/or receiver 156, the DSP 308, and/or the memory 306. In various embodiments of the invention, the processor 304 may receive control information from the femtocell controller 107. In this regard, the processor 304 may be enabled to provide one or more signals to the cellular Tx/Rx 308, the memory 306, and/or the DSP 308 to control communication between the femtocell 112 and an end-user device 116. In addition, the processor 304 may control exemplary parameters comprising power level, modulation scheme, error coding scheme, and/or data rates of transmitted cellular signals.

The memory 306 may comprise suitable logic, circuitry, and/or code that may enable storage or programming of information that includes parameters and/or code that may effectuate the operation of the femtocell 112. A portion of the programming information and/or parameters may be received from the femtocell controller 107. The parameters may comprise configuration data and the code may comprise operational code such as software and/or firmware, but the information need not be limited in this regard. Moreover, the parameters may include adaptive filter and/or block coefficients. Additionally, the memory 306 may buffer or otherwise store received data and/or data to be transmitted. In various embodiments of the invention, the memory 306 may comprise one or more look-up tables which may be utilized for determining cellular devices to be serviced by the femtocell 112.

The DSP 308 may comprise suitable logic, circuitry, and/or code operable to perform computationally intensive processing of data. In various exemplary embodiments of the invention, the DSP 308 may operable to encode, decode, modulate, demodulate, encrypt, decrypt, scramble, descramble, and/or otherwise process data. In various embodiments of the invention, the DSP 308 may be enabled to adjust a modulation scheme, error coding scheme, and/or data rates of transmitted cellular signals data.

In operation, the femtocell 112 may handle communication between one or more UEs 116 and a remote communication device, for example, the telephone 124a, the laptop 124b and/or the application server 124c. The FC Comm Tx/Rx 310 may receive communication management messages from the femtocell controller 107. The processor 304 may utilize the received management messages to configure the cellular Tx/Rx 308 and/or the DSP 308 with control parameters for a communication channel to the UEs 116. Control parameters may comprise transmission power levels, error coding scheme for transmitted cellular signals, data rates for transmitted cellular signals, and modulation scheme for transmitted signals. Additionally, management messages from the femtocell controller 107 may be communicated to the UEs 116 via the cellular Tx/Rx 308. Additionally, the FC comm Tx/Rx 310 may transmit and receive data to and from the FC controller 107. Likewise, the cellular Tx/Rx 308 may transmit and receive data to and from one or more UEs 116.

The cellular Tx/Rx 308 may determine characteristics such as interference levels and signal strength of desired signals received via a cellular communication channel. Similarly, the DSP 308 and/or the processor 304 may be operable to determine bit error rates of data received via a cellular communication channel and available bandwidth of the channel. The measurements may be communicated to the FC controller 107 by the FC comm Tx/Rx 310 via the wired interface 213 and/or the wireless interface 211. Additionally, the femtocell 112 may receive feedback from a UE 116 on the other end of a cellular communication channel and the received feedback information may be communicated to the FC controller 107 by the FC comm Tx/Rx 310.

In various embodiments of the invention, the femtocell 112 may be controlled and/or configured via a user interface. For example, a user may log into the femtocell 112 via a web browser. In this regard, a user interface may enable a network administrator to configure parameters such as antenna directionality, frequencies of operation, transmit power, permissions, and security settings. The user interface may also enable the administrator to enter location information of the femtocell 112. In this regard, a network administrator may enter, for example, a canonical name to be associated with the femtocell 112, a street address for the location of the femtocell 112, and/or a building or location name in an enterprise system. The location information may be communicated among the WLAN access point 106, the femtocell controller 107, and the network FC-to-WLAN bridge and controller 110. Additionally or alternatively, the location information may be managed hierarchically. In this regard, the femtocell 112 may determine and store location information for UEs 116 with which it communicates. Furthermore, the femtocell 112 may communicate the determined UE 116 location information along with its own location information to the femtocell controller 107.

Figure 3B:
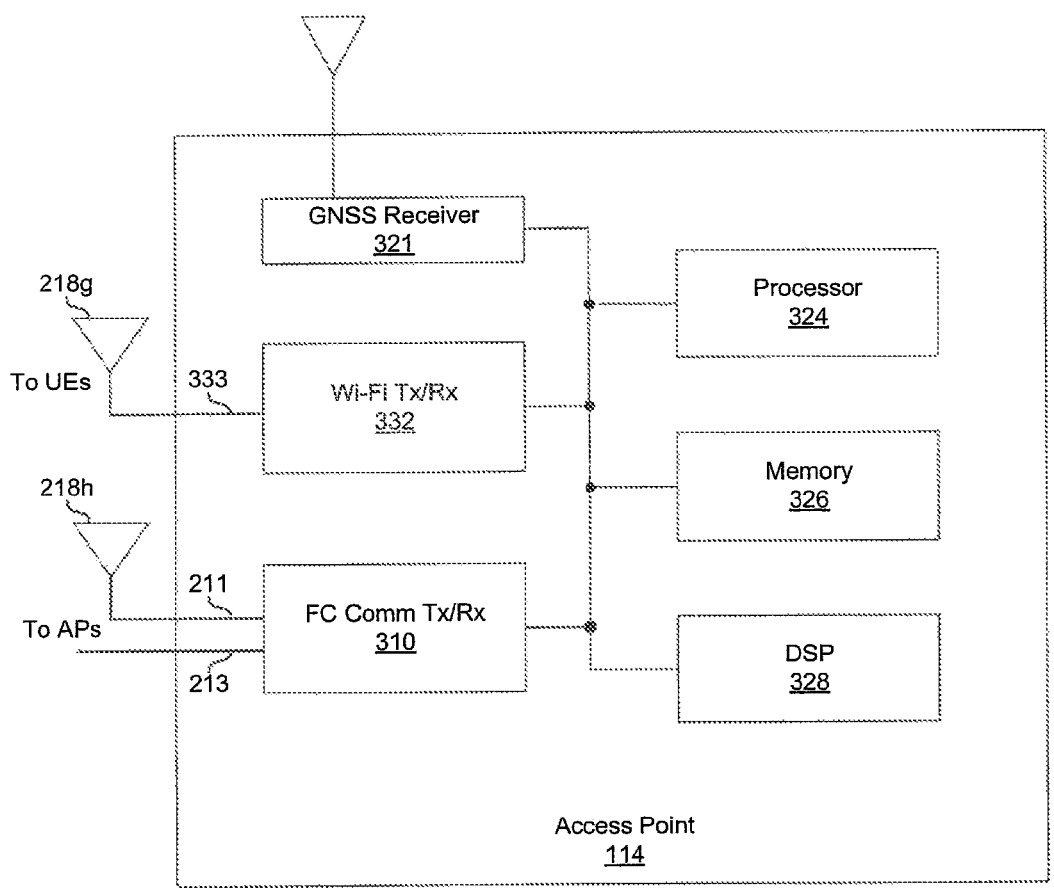
FIG. 3B is a block diagram of an exemplary access point, in accordance with an embodiment of the invention.

FIG. 3B is a block diagram of an exemplary access point, in accordance with an embodiment of the invention. Referring to FIG. 3B, there is shown an AP 114 comprising a GNSS receiver 202, a processor 304, a memory 306, a DSP 308, a cellular Tx/Rx 308, and a femtocell controller communications (FC Comm) Tx/Rx 310. The access point 114 may be as described with respect to FIGS. 1A and 1B.

The FC Comm Tx/Rx 310 may be substantially similar to the femtocell communications Tx/Rx 222 described with respect to FIGS. 2B and 2C.

The GNSS receive 321 may be similar to the GNSS receiver 202 described with respect to FIG. 2A. GNSS coordinates determined based on received GNSS signals may be utilized in managing communications by the AP 114. Determined GNSS coordinates may be communicated to other devices in a network such as the femtocell controller 107, the AP controller 106, and the FC-to-WLAN network bridge and controller 110. Accordingly, the location of the AP 114 may be a determining factor in deciding how to manage data communicated in a multi-standard network such as the sub-network 118 (FIG. 1B).

The Wi-Fi Tx/Rx 332 may comprise suitable logic circuitry and/or code that may be operable to transmit and/or receive data to the UEs 116 utilizing IEEE 802.11 standards. In various embodiments of the invention, an AP 114 may utilize the same Wi-Fi Tx/Rx 332 for communicating with UEs 116 and with the AP controller 106. The Wi-Fi Tx/Rx 332 may comprise suitable logic, circuitry, and/or code that may be operable to transmit and/or receive data to and/or from one or more APs 114 via the wireless interface 333. The Wi-Fi Tx/Rx 332 may be operable to perform exemplary operations or functions comprising amplification, down-conversion, filtering, demodulation, and analog to digital conversion of received signals and/or signals to be transmitted. In various exemplary embodiments of the invention, a connection 113 (FIG. 1B) to one or more UEs 116 may be established via the interface 333 utilizing IEEE 802.11 protocols. The Wi-Fi Tx/Rx 332 may transmit and receive via an antenna 218g and antenna directionality may be controlled via one or more control signals and/or based on received control data. Additionally, transmitted signal strength of the Wi-Fi Tx/Rx may be controlled via one or more control signals and/or based on received control data.

The processor 324 may comprise suitable logic, circuitry, and/or code that may enable processing data and/or controlling operations of the AP 114. In this regard, the processor 324 may be enabled to provide control signals to the various other blocks comprising the AP 114. The processor 324 may also control data transfers between various portions of the AP 114. Additionally, the processor 324 may enable execution of applications programs and/or code. In various embodiments of the invention, the applications, programs, and/or code may enable, for example, parsing, transcoding, or otherwise processing data. The applications, programs, and/or code may enable, for example, configuring or controlling operation of the Wi-Fi Tx/Rx 332, the FC comm Tx/Rx 310, the DSP 328, and/or the, memory 326. The processor 324 may receive control information from the AP controller 106. In this regard, the processor 324 may be enabled to provide one or more signals to the Wi-Fi Tx/Rx 332, the FC comm Tx/Rx 310, the memory 326, and/or the DSP 328 to control communication between the AP 114 and the UEs 116. In addition, the processor 324 may control parameters such as power level, modulation scheme, error coding scheme, and/or data rates of transmitted Wi-Fi signals The memory 326 may comprise suitable logic, circuitry, and/or code that may enable storage or programming of information that includes parameters and/or code that may effectuate the operation of the AP 114. A portion of the programming information and/or parameters may be received from the AP controller 106. Parameters may comprise configuration data and the code may comprise operational code such as software and/or firmware, but the information need not be limited in this regard. Moreover, the parameters may include adaptive filter and/or block coefficients. Additionally, the memory 326 may buffer or otherwise store received data and/or data to be transmitted. In various embodiments of the invention, the memory 326 may comprise one or more look-up tables which may be utilized for determining Wi-Fi access within a coverage area of the AP 114.

The DSP 328 may comprise suitable logic, circuitry, and/or code operable to perform computationally intensive processing of data. In various embodiments of the invention, the DSP 328 may encode, decode, modulate, demodulate, encrypt, decrypt, scramble, descramble, and/or otherwise process data. The DSP 328 may be enabled to adjust a modulation scheme, error coding scheme, and/or data rates of transmitted Wi-Fi signal data.

In operation, the AP 114 may handle communication between one or more UEs 116 and a remote communication device, for example, the telephone 124a, the laptop 124c and/or the application server 124b. In this regard, the FC comm Tx/Rx 310 may receive network management messages from the AP controller 106. The processor 324 may utilize the received management messages to configure the Wi-Fi Tx/Rx 332 and/or the DSP 328 to control operating parameters of Wi-Fi communication channels 115 to one or more UEs 116. Exemplary operating parameters comprise transmission power levels, error coding scheme for transmitted cellular signals, data rates for transmitted cellular signals, and modulation scheme for transmitted signals. Additionally, management messages from the AP controller 106 may be communicated to the UEs 116 via the Wi-Fi Tx/Rx 332.

The Wi-Fi Tx/Rx 332 may determine characteristics such as interference levels and signal strength of desired signals received via a Wi-Fi communication channel. Similarly, the DSP 328 and/or the processor 324 may determine bit error rates of data received via a Wi-Fi communication channel and available bandwidth of the channel. The measurements may be communicated to the AP controller 106 by the FC comm Tx/Rx 310 via the wired interface 213 and/or the wireless interface 211. Additionally, the AP 114 may sand and/or receive feedback to and/or from one or more UEs 116 via the interface 333 that may also be communicated to the AP controller 106 by the FC comm. Tx/Rx 310.

In various embodiments of the invention, the AP 114 may be controlled and/or configured via a user interface. For example, a user may log into the AP 114 via a web browser. In this regard, a user interface may enable a network administrator to configure parameters such as antenna directionality, frequencies of operation, transmit power, permissions, and security settings. The user interface may also enable the administrator to enter location information of the AP 114. In this regard, a network administrator may enter, for example, a canonical name to be associated with the AP 114, a street address for the location of the AP 114, and/or a building or location name in an enterprise system. The location information may be communicated among the WLAN access point 106, the femtocell controller 107, and the network FC-to-WLAN bridge and controller 110. Additionally or alternatively, the location information may be managed hierarchically. In this regard, the AP 114 may determine and store location information for UEs 116 with which it communicates. Furthermore, the AP 114 may communicate the determined UE 116 location information along with its own location information to the AP controller 106.

Figure 3C:
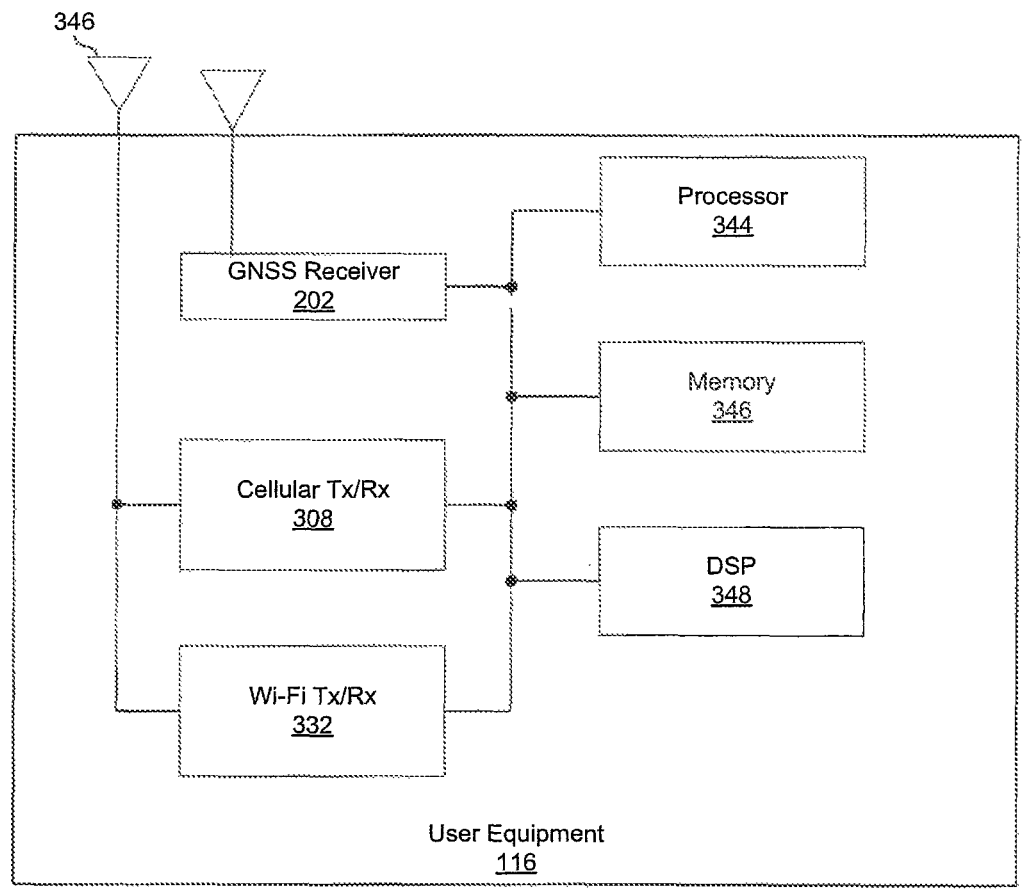
FIG. 3C is a block diagram of exemplary user equipment, in accordance with an embodiment of the invention.

FIG. 3C is a block diagram of exemplary user equipment, in accordance with an embodiment of the invention. Referring to FIG. 3C, the UE 116 may comprise a GNSS receiver 202, a processor 344, a memory 346, a DSP 348, a cellular Tx/Rx 308, and a Wi-Fi Tx/Rx 332. The UE 116 may be as described with respect to FIGS. 1A and 1B.

The GNSS receiver 202 may be as described with respect to FIG. 2A. The cellular Tx/Rx 308 may be as described with respect to FIG. 3A. The Wi-Fi Tx/Rx 332 may be as described with respect to FIG. 3B.

The processor 344 may comprise suitable logic, circuitry, and/or code that may enable processing data and/or controlling operations of the UEs 116. In this regard, the processor 344 may be enabled to provide control signals to the various other blocks within the UE 116. The processor 344 may also control data transfers between various portions of the UE. Additionally, the processor 344 may enable execution of applications programs and/or code. In various embodiments of the invention, the applications, programs, and/or code may enable processing data. The applications, programs, and/or code may enable, for example, configuring or controlling operation of the cellular Tx/Rx 308, the GNSS receiver 202, the Wi-Fi TxRx 332, the DSP 348, and/or the memory 346. The processor 344 may receive control information from the AP controller 106 and/or the femtocell controller 107. In this regard, the processor 344 may be enabled to provide one or more control signals to the cellular Tx/Rx 308, the Wi-Fi Tx/Rx 332, the memory 346, and/or the DSP 348 to control communication between the UEs 116 and a femtocell 112 or an AP 114. In addition, the processor 344 may control parameters such as power level, modulation scheme, error coding scheme, and/or data rates of transmitted cellular and/or Wi-Fi signals.

The memory 346 may comprise suitable logic, circuitry, and/or code that may enable storage or programming of information that includes parameters and/or code that may effectuate the operation of the UE 116. A portion of the programming information and/or parameters may be received from and/or transmitted to the AP controller 106 and/or the FC controller 107. Parameters may comprise configuration data and the code may comprise operational code such as software and/or firmware, but the information need not be limited in this regard. Moreover, the parameters may include adaptive filter and/or block coefficients. Additionally, the memory 346 may buffer or otherwise store received data and/or data to be transmitted. In various embodiments of the invention, the memory 346 may comprise one or more look-up tables which may be utilized to determine which femtocells 112 and/or APs 114 are within range of the UEs 116.

The DSP 348 may comprise suitable logic, circuitry, and/or code operable to perform computationally intensive processing of data. The DSP 348 may be operable to encode, decode, modulate, demodulate, encrypt, decrypt, scramble, descramble, and/or otherwise process data. In various embodiments of the invention, the DSP 348 may be enabled to adjust a modulation scheme, error coding scheme, and/or data rates of transmitted cellular and/or Wi-Fi signal data.

In operation, the UEs 116 may communicate with remote communication devices, for example, the telephone 124a, the laptop 124c and/or the application server 124b via one or more of femtocells 112 and/or APs 114 that are controlled by the interoperation of the AP controller 106, the FC controller 107, and the FC-to-WLAN network bridge and controller 110. The AP controller 106, the FC controller 107, and/or the FC-to-WLAN network bridge and controller 110 may provide control information to UEs 116 via one or more femtocells 112 and APs 114. In addition, the AP controller 106, the FC controller 107, and/or the FC-to-WLAN network bridge and controller 110 may assign a particular femtocell 112 and/or AP 114 to handle a call and/or session of the UEs 116. The AP controller 106, the FC controller 107, and/or the FC-to-WLAN network bridge and controller 110 may handle QoS for data and/or voice traffic of a UE 116 call and/or session.

In an exemplary embodiment of the invention, control messages from AP controller 106, the FC controller 107, and/or the FC-to-WLAN network bridge and controller 110 may be received by the UEs 116 via the cellular Tx/Rx 308 and/or the Wi-Fi Tx/Rx 332. The processor 344 may utilize the received control information to configure the UEs 116 and/or to manage call and/or session set up and/or call and/or session processing. In addition, the AP controller 106, the FC controller 107, and/or the FC-to-WLAN network bridge and controller 110 may manage transmission power levels, error coding scheme, data rates, and modulation scheme for signals transmitted from the UEs 116.

Furthermore, The UEs 116 may communicate various operational status indications to the AP controller 106, the FC controller 107, and/or the FC-to-WLAN network bridge and controller 110. For example, the cellular Tx/Rx 308 and/or the Wi-Fi Tx/Rx 332 may determine characteristics such as interference levels and signal strength of desired signals received via a cellular and/or Wi-Fi communication channel. Similarly, the DSP 346 and/or the processor 344 may determine bit error rates of received data and available bandwidth of the cellular and/or Wi-Fi channel. Information stored in the memory 306 and/or measurements taken by the cellular Tx/Rx 308, Wi-Fi Tx/Rx 332 and/or DSP 348 may be communicated to the AP controller 106, the FC controller 107, and/or the FC-to-WLAN network bridge and controller 110 via the Femtocell 112 and/or the AP 114.

In various embodiments of the invention, the UEs 116 may be a multimode wireless device and may comprise a plurality of diverse wireless transmitters and/or receivers (Tx/Rx). In this regard, the UEs 116 may be operable to receive signals from one or more femtocells or APs that may utilize different wireless standards. The UEs 116 may be operable to select portions of information and/or combine information from the plurality of received signals based on the quality of received information and/or the quality of the received signals.

Figure 4:
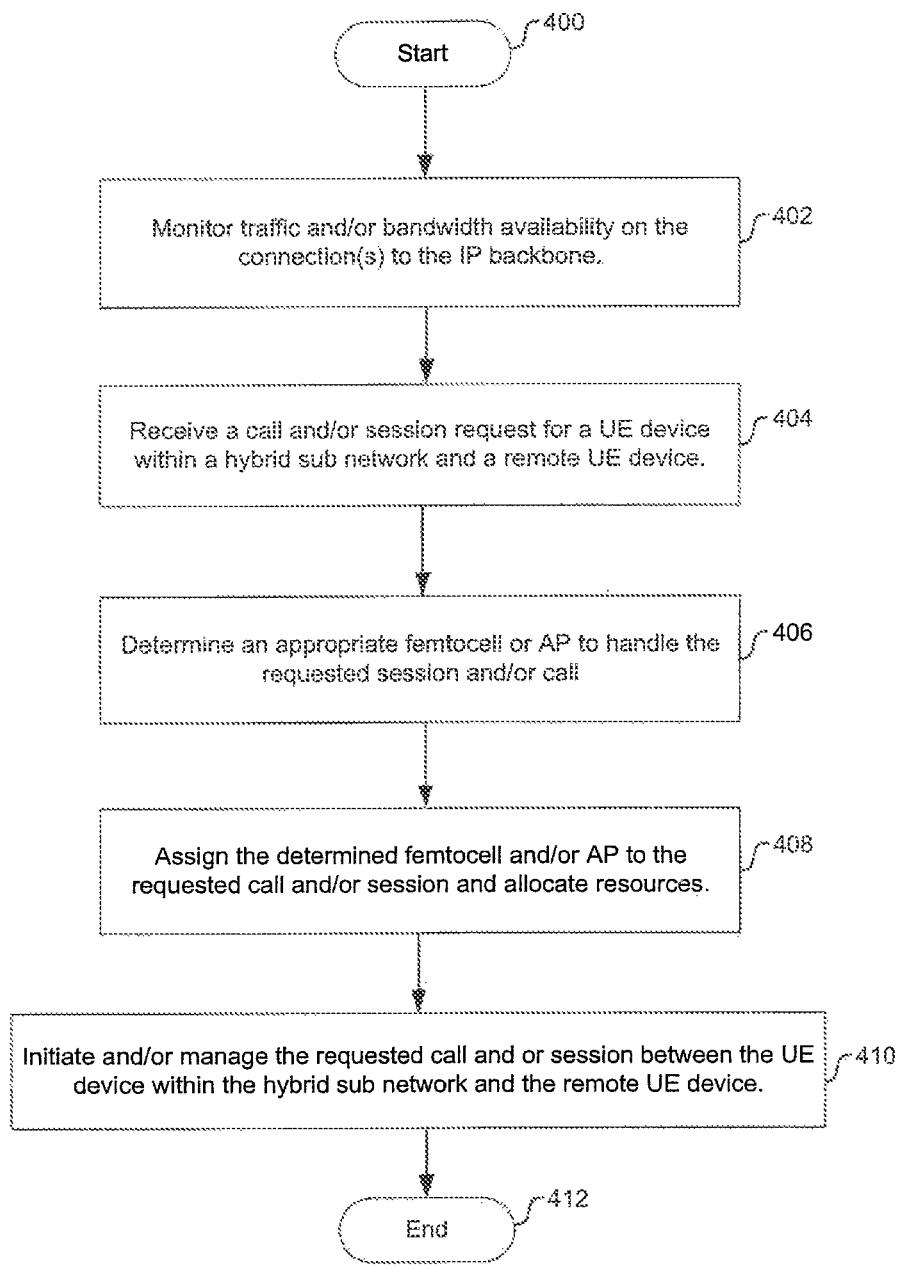
FIG. 4 illustrates exemplary steps for managing communication for a FC-to-WLAN sub-network comprising femtocells and/or access points by an AP controller, an FC controller, and a FC-to-WLAN network bridge and controller, in accordance with an embodiment of the invention.

FIG. 4 illustrates exemplary steps for managing communication for a FC-to-WLAN sub-network comprising femtocells and/or access points by an AP controller, an FC controller, and a FC-to-WLAN network bridge and controller, in accordance with an embodiment of the invention. Referring to FIG. 4, the exemplary steps may begin with start step 400. In step 402, the AP controller 106, the FC controller 108, and the FC-to-WLAN network bridge and controller 110 may monitor traffic, bandwidth availability, and/or a load on the connections 101a and 101b. In step 404, the AP controller 106, the FC controller 108, and/or the FC-to-WLAN network bridge and controller 110 may receive a request for a call and/or session for a UE 116 device within a multi-standard sub network 118 and a remote UE device in the wired and/or wireless communication backbone 102. For example, the remote UE may be a cellular phone served by the cellular network 104a.

In step 406, the AP controller 106, the FC controller 108, and/or the FC-to-WLAN network bridge and controller 110 may determine which femtocell or AP within the FC-to-WLAN sub network 118 may be appropriate for handling the requested session and/or call. The AP controller 106, the FC controller 108, and/or the FC-to-WLAN network bridge and controller 110 may base the determination on an appropriate QoS for the session and/or call, an appropriate bandwidth for the session and/or call, and/or based on the load on the femtocells and APs and on the connections 101a and 101b. For example, voice may require a particular QoS or a user may request delivery of content having a particular QoS. In addition, the determination may be based on information from monitoring traffic and/or bandwidth availability on the connections 101a and 101b. In step 408, the AP controller 106, the FC controller 108, and/or the FC-to-WLAN network bridge and controller 110 may assign the determined femtocell 112 and/or AP 114 to the requested call and/or session and may allocate resources for communication of data for the call and/or session over the connections 101a and/or 101b to the remote UE device. In step 410, the AP controller 106, the FC controller 108, and/or the FC-to-WLAN network bridge and controller 110 may Initiate and/or manage the requested call and or session between the UE device 116 within the FC-to-WLAN sub network 118 and the remote UE device. The exemplary steps may end with step 412.

Aspects of a method and system for communicatively coupling WLAN and femtocell networks utilizing a FC-to-WLAN network bridge and controller are provided. In an exemplary embodiment of the invention, data communicated via one or more femtocells 112 and one or more WLAN access points 114 may be managed via a FC-to-WLAN network bridge and controller 110 communicatively coupled to and/or between a femtocell controller 107 and an access point controller 106. The femtocell controller 107 may be operable to manage and/or control operation of the one or more femtocells 112 and the access point controller 106 may be operable to manage and/or control operation of the one or more WLAN access points 114. The FC-to-WLAN network bridge and controller 110, the femtocell controller 107, and/or the access point controller 106 may interoperate to manage data communicated between a first end-user device 116a communicatively coupled to the femtocell 112a and an end-user device 116d communicatively coupled to the access point 114b.

Data communicated between the end-user device 116a and the end-user device 116d may traverse the femtocell controller 107, the FC-to-WLAN network bridge and controller 110, and the access point controller 106. The FC-to-WLAN network bridge and controller 110, the access point controller 106, and the femtocell controller 107 may interoperate to deliver a portion of a datastream to an end-user device 116b via the femtocell 112b and delivering a remaining portion of the datastream to the end-user device 116b via the WLAN access point 114a. Hand-offs of one or more end-user 116 devices among femtocells 112 and/or among WLAN access points 114 may be coordinated by the FC-to-WLAN network bridge and controller 110. One or more of the FC-to-WLAN network bridge and controller 110, the access point controller 106, and the femtocell controller 107 may coordinate hand-offs of one or more end-user devices 116 between one or more of the femtocells 112 and one or more of the WLAN access points 114.

The femtocell controller 107 may be communicatively coupled to an IP backbone via a first connection 101b and the access point controller 106 may be communicatively coupled to the IP backbone via a second connection 101a. A load on the first connection 101b and/or the second connection 101a may be balanced by the FC-to-WLAN network bridge and controller 110. The FC-to-WLAN network bridge and controller 110 may manage quality of service on the connections 101b and 101a. One or more of the FC-to-WLAN network bridge and controller 110, the access point controller 106, and the femtocell controller 107 may determine whether a destination of the data may be reached via the FC-to-WLAN network bridge and controller 110 or may be reached via the IP backbone 102. One or more of the FC-to-WLAN network bridge and controller 110, the access point controller 106, and the femtocell controller 107 may control transmission power and/or antenna directionality of the femtocells 112 and/or WLAN access points 114. One or more of the FC-to-WLAN network bridge and controller 110, the access point controller 106, and the femtocell controller 107 may manage communication of the data based on location information associated with one or more of the network FC-to-WLAN bridge and controller 110, the femtocell controller 107, the access point controller 106, the one or more femtocells 112, and the one or more WLAN access points 114. The location information may be determined via one or both of input entered via a user interface and GNSS coordinates.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for communicatively coupling WLAN and Femtocell Networks utilizing a FC-to-WLAN network bridge and controller.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for operating a network, the method comprising:
   receiving, at a femtocell to wireless local area networking (FC-to-WLAN) network bridge and controller, information from a femtocell controller that is indicative of network load conditions on a first connection between the FC-to-WLAN network bridge and controller and the femtocell controller;
   receiving, at the FC-to-WLAN network bridge and controller, information from an access point controller that is indicative of network load conditions on a second connection between the FC-to-WLAN network bridge and controller and the access point controller;
   determining, by the FC-to-WLAN network bridge controller, a handoff procedure to balance the network load conditions based on the information from the femtocell controller and the information from the access point controller; and
   executing the handoff procedure, by the FC-to-WLAN network bridge and controller, to route network traffic to an end-user device between the first connection and the second connection.

2. The method of claim 1, wherein the executing comprises:
   controlling a handoff of the end-user device between the femtocell controller and the access point controller to balance network traffic flow.

3. The method of claim 1, further comprising:
   controlling a transmission power or an antenna directionality of the femtocell controller or the access point controller using the FC-to-WLAN network bridge and controller.

4. The method of claim 1, wherein the information from the femtocell controller and the information from the access point controller includes location information corresponding to:
   the femtocell controller;
   a femtocell coupled to the femtocell controller;
   the access point controller; or
   an access point coupled to the access point controller, and wherein the executing further comprises:
      executing the handoff procedure to route the network traffic based on the location information.

5. The method of claim 1, wherein the femtocell controller is coupled to an internet protocol (IP) backbone via a first IP backbone connection,
   wherein the access point controller is coupled to the IP backbone via a second IP backbone connection, and
   wherein the executing comprises:
      executing the handoff procedure to route the network traffic to the end-user device between the first connection and the second connection to balance the network load conditions between the first IP backbone connection and the second IP backbone connection.

6. The method of claim 5, further comprising:
   managing a quality of service on the first IP backbone connection and the second IP backbone connection.

7. An apparatus for networking, comprising:
   a first controller, coupled to an end-user device via a first connection, configured to:
      accommodate a first communications protocol;
      send network load information indicative of network load conditions on the first connection to a network bridge and controller; and
   a second controller, coupled to the network bridge and controller, configured to:
      accommodate a second communications protocol in response to a control signal to balance the network load conditions,
   wherein the network bridge controller is configured to:
      determine a handoff procedure to balance network traffic between the first controller and the second controller, and
      execute the handoff procedure to balance the network traffic.

8. The apparatus of claim 7, wherein the first communications protocol is a cellular communications protocol, and wherein the second communications protocol is a wireless networking communications protocol.

9. The apparatus of claim 8, wherein the first controller is coupled to a femtocell, and wherein the end-user device is within a coverage area serviced by the femtocell.

10. The apparatus of claim 9, wherein the network load information comprises:
    a traffic load of the femtocell;
    a number of network connections supported by the femtocell;
    an available bandwidth of the femtocell;
    a processor usage of the femtocell; or
    a memory usage of the femtocell.

11. The apparatus of claim 7, wherein the network load information comprises:
    a traffic load on the first connection;
    a number of network connections supported by the first controller;
    an available bandwidth of the first connection;
    a processor usage of the first controller; or
    a memory usage of the first controller.

12. The apparatus of claim 7, wherein the second controller is coupled to a wireless local area networking (WLAN) access point, and wherein the end-user device is within a coverage area serviced by the WLAN access point.

13. The apparatus of claim 12, wherein the network load information comprises:
    a traffic load of the WLAN access point;
    a number of network connections supported by the WLAN access point;

an available bandwidth of the WLAN access point;
a processor usage of the WLAN access point; or
a memory usage of the WLAN access point.

14. The apparatus of claim 7, wherein the first controller is further configured to route a first portion of a datastream to the end-user device and to route a second portion of the datastream to the second controller.

15. An apparatus for networking, comprising:
a network bridge and controller;
a first controller, coupled to the network bridge and controller and a femtocell, configured to receive a datastream from an end-user device via a first connection and to accommodate a first communications protocol; and
a second controller, coupled to the network bridge and controller, configured to accommodate a second communications protocol, the second controller being further coupled to the end-user device via a second connection:
wherein the first controller is further configured to send network load information indicative of network load conditions on the first connection to the network bridge and controller; and
wherein the network bridge and controller is configured to:
determine a handoff procedure to balance the datastream between the first controller and the second controller based on the network load information, and
execute the handoff procedure to balance the datastream between the first controller and the second controller.

16. The apparatus of claim 15, wherein the first communications protocol is a wireless cellular communications protocol, and wherein the second communications protocol is a wireless networking communications protocol.

17. The apparatus of claim 15, wherein the first controller is coupled to an internet protocol (IP) backbone via a first IP backbone connection, wherein the second controller is coupled to the IP backbone via a second IP backbone connection, and wherein the network bridge and controller is further configured to balance network traffic flow between the first IP backbone connection and the second IP backbone connection.

18. The apparatus of claim 17, wherein the network bridge and controller is further configured to manage a quality of service on the first IP backbone connection and the second IP backbone connection.

19. The apparatus of claim 15, wherein the network load conditions comprise:
a first load corresponding to the first controller and the end-user device; or
a second load corresponding to the second controller and the end-user device.

20. The apparatus of claim 15, wherein the handoff procedure is configured to control a handoff of the end-user device between the first controller and the second controller to balance the network traffic flow.

* * * * *